United States Patent [19]

Yamada et al.

[11] Patent Number: 4,808,503

[45] Date of Patent: Feb. 28, 1989

[54] ELECTROPHOTOGRAPHIC RECEPTORS WITH CHARGE GENERATING AZO-SUBSTITUTED TETRAPHENYL-THIOPHENE OR THIOPHENE 1,1-DIOXIDE

[75] Inventors: Yasuyuki Yamada; Hisato Itoh; Tsutomu Nishizawa, all of Yokohama; Akihiro Yamaguchi, Kamakura, all of Japan

[73] Assignee: Mitsui Toatsu Chemicals, Incorporated, Tokyo, Japan

[21] Appl. No.: 110,757

[22] PCT Filed: Jun. 4, 1987

[86] PCT No.: PCT/JP87/00353

§ 371 Date: Aug. 28, 1987

§ 102(e) Date: Aug. 28, 1987

[87] PCT Pub. No.: WO87/07736

PCT Pub. Date: Dec. 17, 1987

[30] Foreign Application Priority Data

Jun. 5, 1986 [JP] Japan ............................ 61-129082

[51] Int. Cl.$^4$ .............................................. G03G 5/06
[52] U.S. Cl. ...................................... 430/75; 430/72; 430/73; 534/806
[58] Field of Search ....................... 430/72, 73, 74, 75, 430/76, 58

[56] References Cited

U.S. PATENT DOCUMENTS 4,612,271 9/1986 Makino et al. ................... 430/72
4,629,672 12/1986 Makino et al. ................... 430/75

Primary Examiner—John L. Goodrow
Attorney, Agent, or Firm—Millen & White

[57] ABSTRACT

Disclosed herein is a electrophotographic photoreceptor having high sensitivity and excellent durability. The photoreceptor has a photosensitive layer which contains an azo compound having the tetraphenylthiophene or tetraphenylthiophene-1,1-dioxide skeleton.

16 Claims, 3 Drawing Sheets

F I G. 5
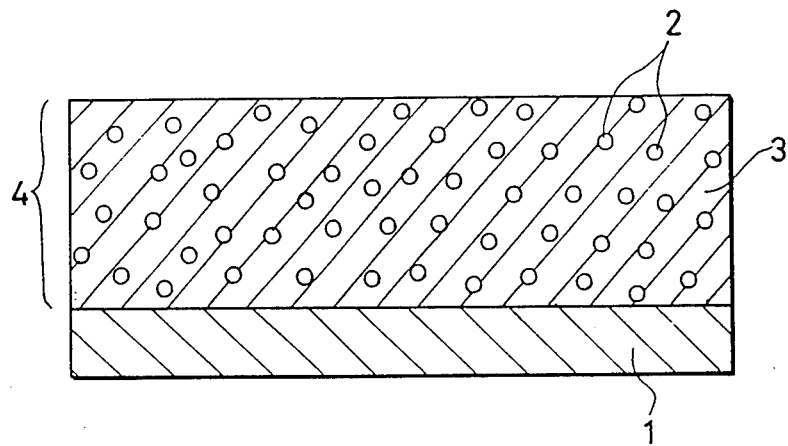
F I G. 6
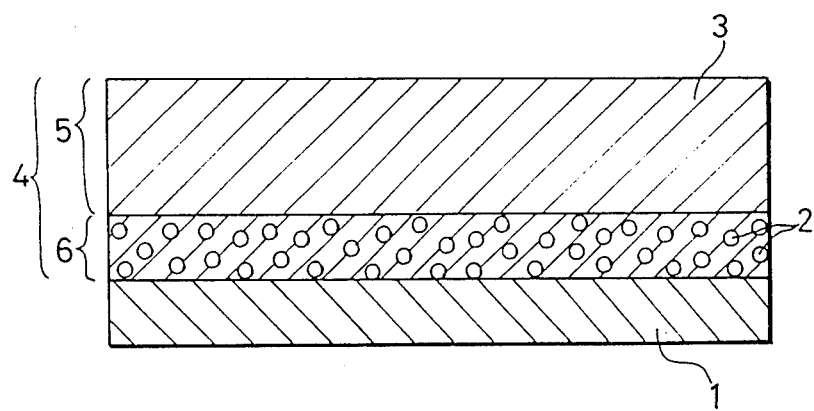

ELECTROPHOTOGRAPHIC RECEPTORS WITH CHARGE GENERATING AZO-SUBSTITUTED TETRAPHENYL-THIOPHENE OR THIOPHENE 1,1-DIOXIDE

TECHNICAL FIELD

This invention relates to an electrophotographic photoreceptor, and more specifically to an electrophotographic photoreceptor containing a novel azo compound as a charge-generating material in a photosensitive layer on an electrically-conductive base.

BACKGROUND ART

Inorganic photosensitive materials such as selenium, cadmium sulfide and zinc oxide have heretofore been used widely as photosensitive materials for electrophotographic photoreceptors. However, photoreceptors using these photosensitive materials cannot fully satisfy properties required as electrophotographic photoreceptors such as sensitivity, light stability, moistureproofness and durability. For example, photoreceptors making use of selenium-base materials have excellent sensitivity. They are however accompanied by many drawbacks, and they are prone to crystallization under heat or by adhesion of smear, so that their characteristic properties as photoreceptors tend to deteriorate. They are fabricated by vacuum evaporation and their fabrication costs are hence high. Due to lack of flexibility, it is difficult to form them into belt-like configurations. Photoreceptors making use of CdS-base materials have problems of moistureproofness and durability, whereas zinc oxide photoreceptors are insufficient in durability.

In order to overcome the above-mentioned drawbacks of photoreceptors which use such inorganic photosensitive materials, various photoreceptors making use of organic photosensitive materials have been studied.

As organic photosensitive materials which have already found some commercial utility, there are known, for example, photoreceptors making combined use of 2,4,7-trinitro-9-fluorenone and poly-N-vinyl-carbazole. However, photoreceptors using the above photosensitive materials have low sensitivity and their durability is also unsatisfactory.

Among photoreceptors developed to improve the above-mentioned drawbacks, photoreceptors which comprises a charge-generating layer and a charge-transporting layer having respective alotted functions (hereinafter called "function-separated photoreceptors) have drawn attention in recent years. In such a function-separated photoreceptor, materials having the above functions separately can be chosen from a wide range of materials and can then be used in combination. It is thus possible to fabricate a high-sensitivity and high-durability photoreceptor. As charge-generating materials useful in such function-separated photoreceptors, many materials have been reported. Of these, photoreceptors making use of organic dyes or organic pigments as charge-generating materials have attracted particular attention in recent years. There have been reported, for example, photoreceptors using disazo pigments having the styryl stilbene skeleton (Japanese Patent Laid-Open No. 133445/1978), photoreceptors using disazo pigments having the carbazole skeleton (Japanese Patent Laid-Open No. 95033/1978), photoreceptors using trisazo pigments having the triphenylamine skeleton (Japanese Patent Laid-Open No. 132347/1978), photoreceptors using disazo pigments having the distyryl carbazole skeleton (Japanese Patent Laid-Open No. 14967/1979), photoreceptors using disazo pigments having the bisstilbene skeleton (Japanese Patent Laid-Open No. 17733/1979), etc. These electrophotographic receptors do not however fully satisfy performance requirements. It has hence been desired to develop still better photoreceptors.

SUMMARY OF THE INVENTION

An object of this invention is to provide an electrophotographic photoreceptor having sufficient sensitivitiy and good durability.

Another object of this invention is to provide a novel charge-generating material useful in electrophotographic photoreceptors.

An azo compound having the tetraphenylthiophene or tetraphenylthiopene-1,1-dioxide skeleton provides an electrophotographic photoreceptor having excellent characteristic properties such as high sensitivity and durability compared with those making use of conventional azo compounds.

The electrophotographic photoreceptors of this invention are characterized in that at least one azo compound represented by the following general formula (I):

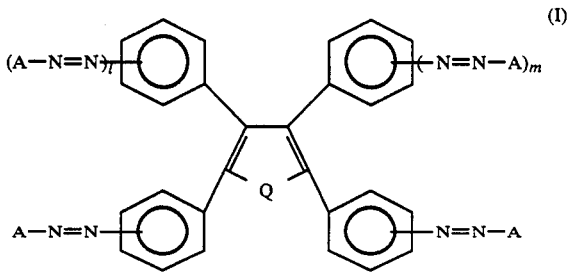

wherein A means a coupler residuum, Q denotes a sulfur atom or $>SO_2$, and l and m stand independently for 1 or 0, is contained in a photosensitive layer provided on an electrically-conductive base.

BRIEF DESCRIPTION OF THE DRAWINGS

In the accompanying drawings:

FIGS. 5 and 6 are schematic cross-sectional views showing illustrative examples of the construction of an electrophotographic photoreceptor respectively.

DETAILED DESCRIPTION

Figure 1:
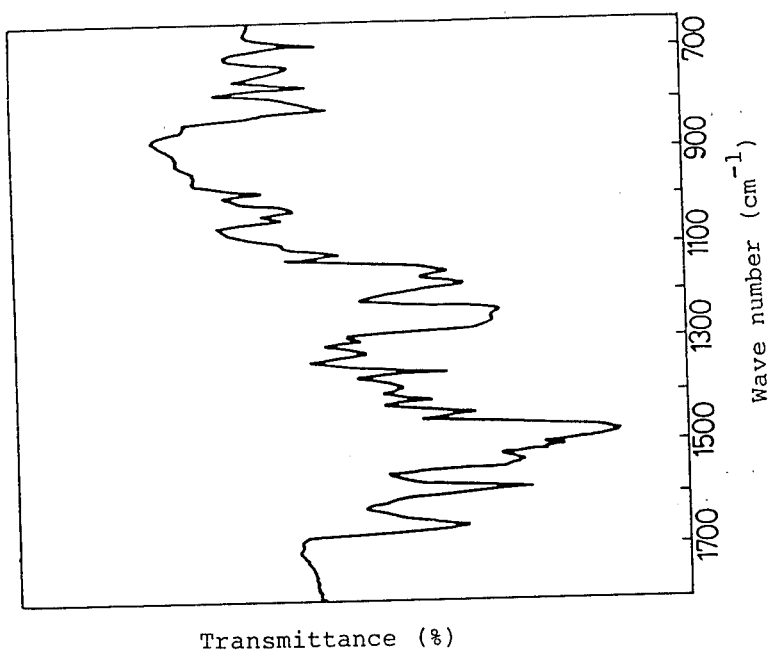
FIGS. 1, 2, 3 and 4 show infrared absorption spectra of Azo Pigment Nos. 1, 2, 29 and 33 as measured respectively by the KBr method.

Azo compounds useful in the practice of this invention are those obtained by intoducing 2-4 azo groups into tetraphenylthiophene or tetraphenyl-thiophene-1,1-dioxide.

As the site of substitution by each azo group, the 4-position of any one of the phenyl groups is preferred i.e., disazo compounds, trisazo compounds and tetrakis-azo compounds in which azo groups has been introduced as a a substituent at the 4-position of 2-4 of the phenyl group.

In the general formula (I), A means a coupler residuum as described above. As illustrative examples of the residuum, the following residua (a)–(d) may be mentioned.

(a) Coupler residua of the following general formula (II):

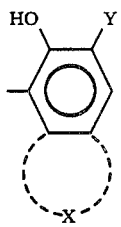

(II)

wherein X means a substituted or unsubstituted cyclic hydrocarbon ring or a substituted or unsubstituted heterocyclic ring, Y denotes

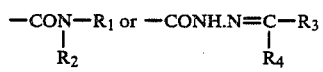

in which $R_1$ means a substituted or unsubstituted cyclic hydrocarbon ring or a substituted or unsubstituted heterocyclic ring, $R_2$ denotes a hydrogen atom, a substituted or unsubstituted alkyl group or a substituted or unsubstituted phenyl group, $R_3$ is a substituted or unsubstituted cyclic hydrocarbon ring, a substituted or unsubstituted heterocyclic ring or a substituted or unsubstituted styryl group, $R_4$ means a hydrogen atom, an alkyl group or a substituted or unsubstituted phenyl group, and $R_3$ and $R_4$ may optionally form a ring together with the carbon atom to which $R_3$ and $R_4$ are bonded.

Illustrative specific examples of X in the general formula (II), are hydrocarbon rings such as naphthalene ring and anthracene rings as well as heterocyclic rings such as indole ring, carbazole ring, benzocarbazole ring and dibenzofuran rings, each of which is fused with the benzene ring to which the hydroxyl group and Y are bonded.

X can be substituted, e.g., with halogen atoms such as chlorine and bromine and hydroxyl group.

Illustrative examples of the cyclic group represented by $R_1$ or $R_3$, are cyclic hydrocarbon groups such as phenyl, naphthyl, anthryl and pirenyl; and heterocyclic groups such as pyridyl, thienyl, furyl indolyl, benzofuryl, carbazolyl and dibenzofuranyl. As a ring which $R_3$ and $R_4$ form as a result of their coupling, the fluorene ring or the like may be mentioned by way of example.

When $R_1$ or $R_3$ is a substituted cyclic ring, illustrative examples of the substituent or substituents are alkyl groups such as methyl, ethyl, propyl and butyl; alkoxy groups such as methoxy, ethoxy, propoxy and butoxy; halogen atoms such as chlorine and bromine atoms; halomethyl groups such as trifluoromethyl; dialkylamino groups such as dimethylamino and diethylamino; nitro group; cyano group; and carboxyl group and its ester groups.

When $R_2$ is a phenyl group, halogen atoms such as chlorine and bromine atoms are illustrative substituents for the phenyl group.

(b) Coupler residua of the following general formula (III) or (IV):

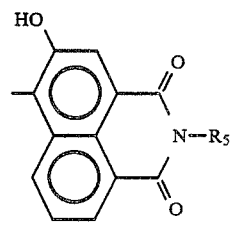

(III)

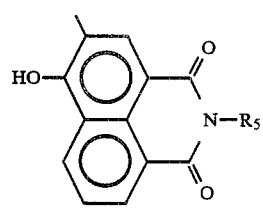

(IV)

wherein $R_5$ means a substituted or unsubstituted hydrocarbon group.

Illustrative specific examples of $R_5$ are alkyl groups such as methyl, ethyl, propyl, butyl and octyl; and alkoxyalkyl groups such as methoxyethyl and ethoxyethyl.

(c) Coupler residua of the following general formula (V):

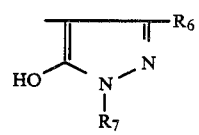

(V)

wherein $R_6$ means alkyl, carbamoyl, or carboxyl or an ester group thereof, $R_7$ denotes a substituted or unsubstituted cyclic hydrocarbon group.

Examples of $R_7$, cyclic hydrocarbon groups are phenyl and naphthyl. When these groups are substituted, illustrative substituents are alkyl groups such as methyl, ethyl, propyl and butyl; alkoxy groups such as methoxy, ethoxy, propoxy and butoxy; dialkylamino groups such as dimethylamino and diethylamino; halogen atoms such as chlorine and bromine atoms; nitro group; and cyano group.

(d) Coupler residua represented by the following general formula (VI) or (VII):

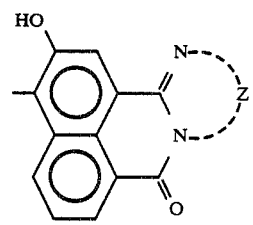

(VI)

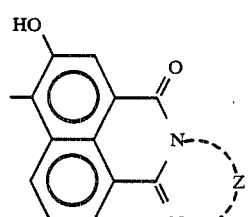

(VII)

wherein Z means a substituted or unsubstituted divalent cyclic hydrocarbon group, or a substituted or unsubstituted divalent heterocyclic group.

As specific examples of Z, are divalent residua of monocyclic aromatic hydrocarbons, such as o-phenylene; divalent residua of fused polycyclic aromatic hydrocarbons, such as o-naphthylene, peri-naphthylene, 1,2-anthraquinonylene and 9,10-phenanthrylene; and divalent residua of heterocyclic rings, such as 3,4-pyrazolediyl, 2,3-pyridinediyl, 4,5-pyrimidinediyl, 6,7-imidazolediyl, 5,6-benzimidazolediyl and 6,7-quinolinediyl. When these cyclic groups are substituted, exemplary substituents include alkyl groups such as methyl, ethyl, propyl and butyl; alkoxy groups such as methoxy, ethoxy, propoxy and butoxy; dialkylamino groups such as dimethylamino and diethylamino; halogen atoms such as chlorine and bromine atoms; nitro group; and cyano group.

Specific examples of such coupler residua are:

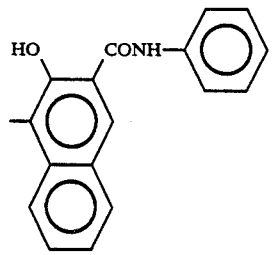 A-1

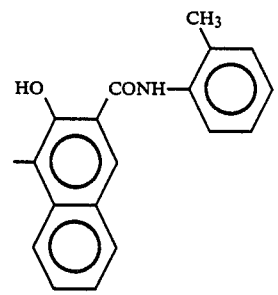 A-2

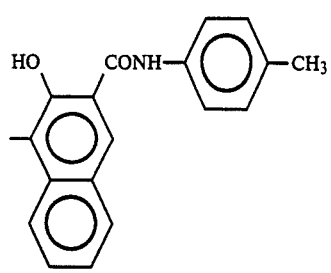 A-3

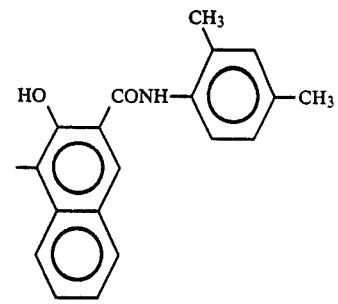 A-4

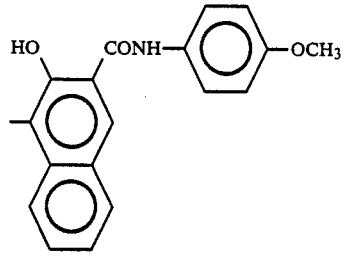 A-5

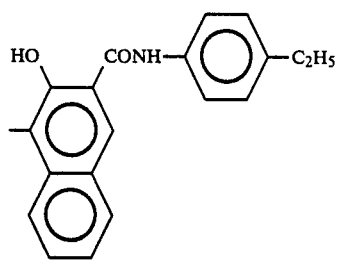 A-6

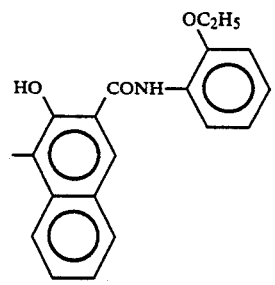 A-7

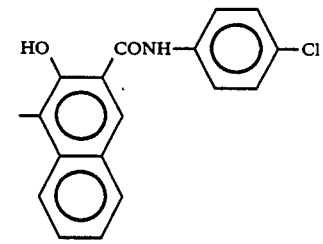 A-8

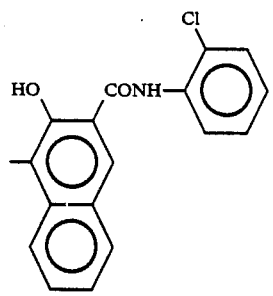 A-9

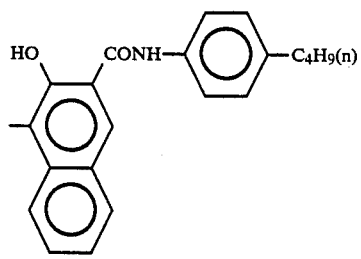 A-10

-continued
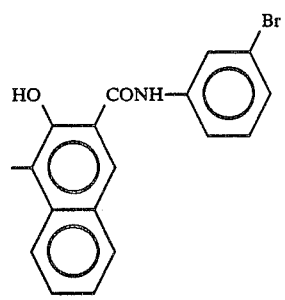
A-11
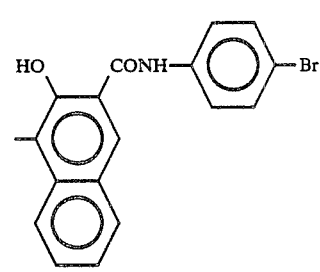
A-12
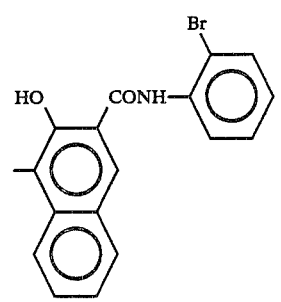
A-13
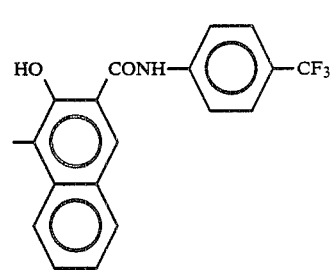
A-14
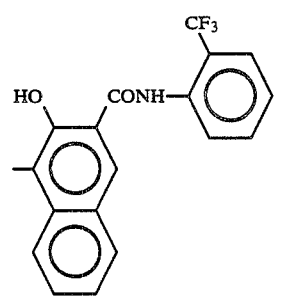
A-15
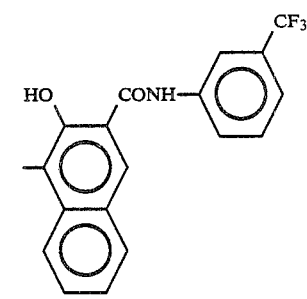
A-16
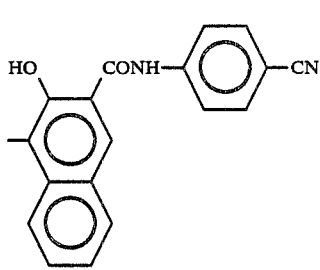
A-17
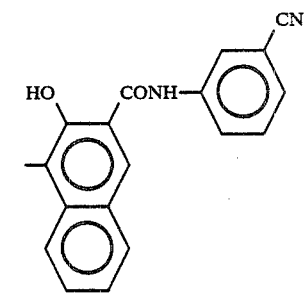
A-18
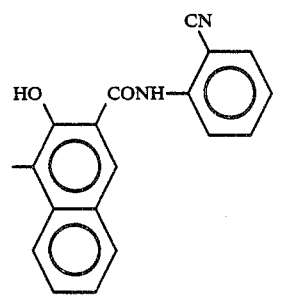
A-19
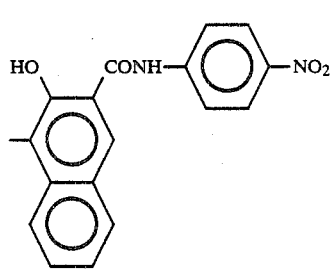
A-20

-continued
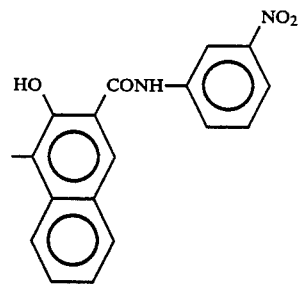 A-21
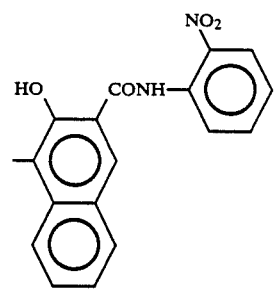 A-22
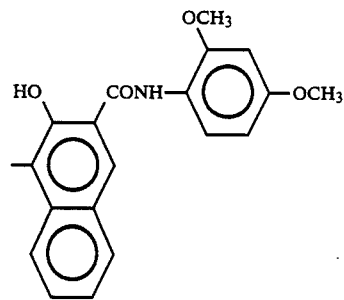 A-23
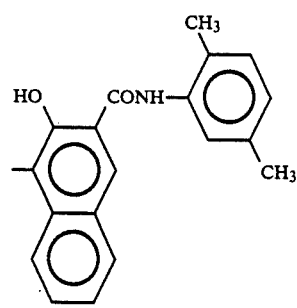 A-24
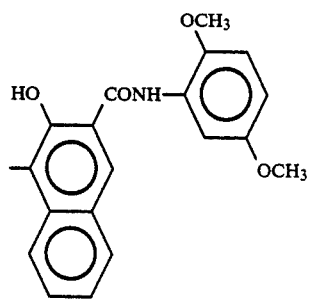 A-25
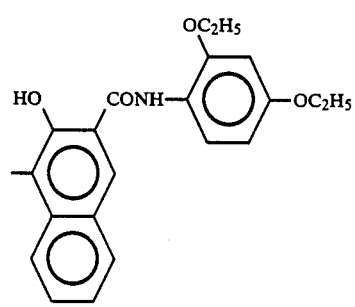 A-26
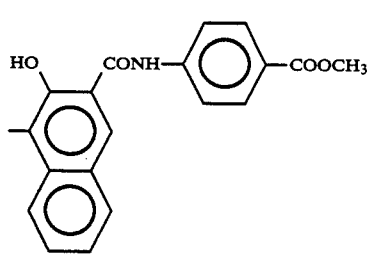 A-27
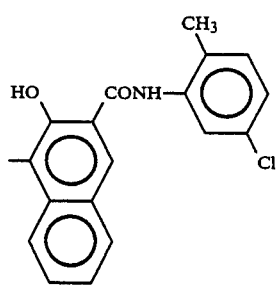 A-28
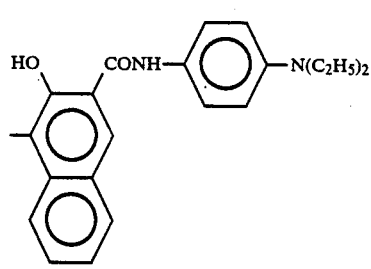 A-29
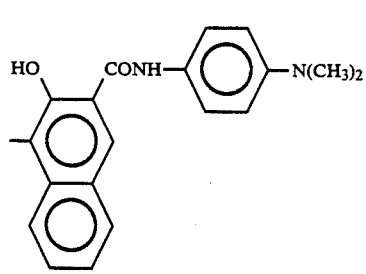 A-30

-continued
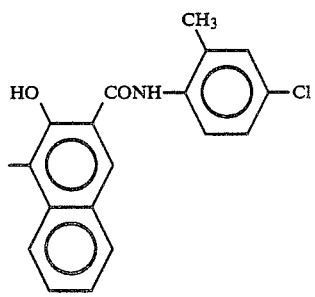 A-31
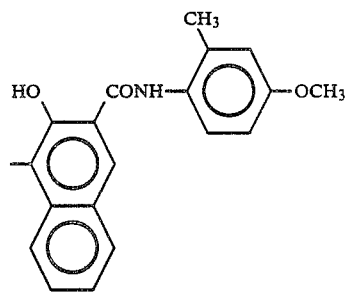 A-32
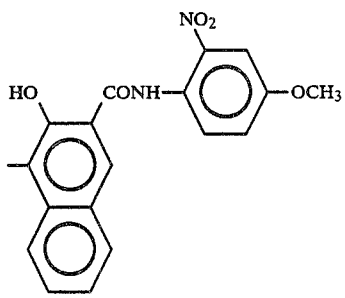 A-33
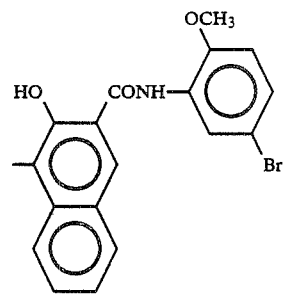 A-34
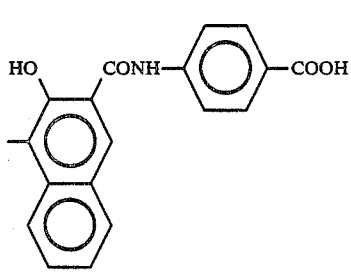 A-35
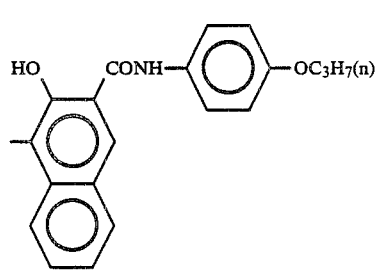 A-36
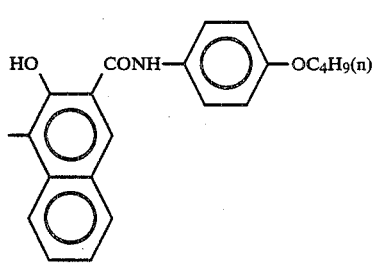 A-37
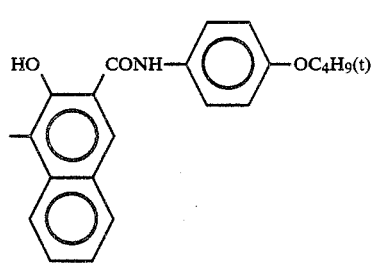 A-38
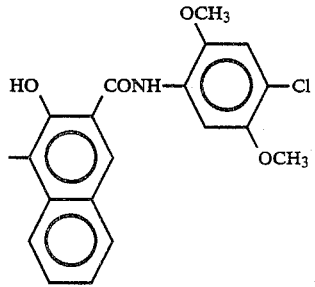 A-39
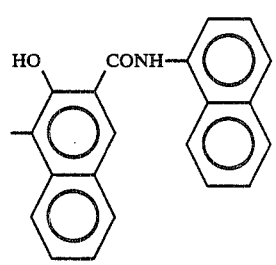 A-40

-continued
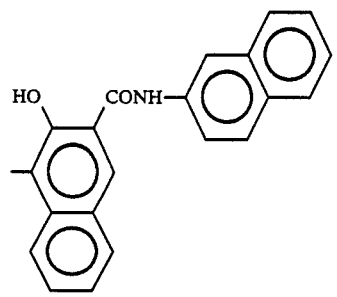
A-41
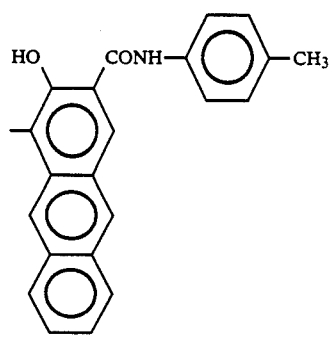
A-42
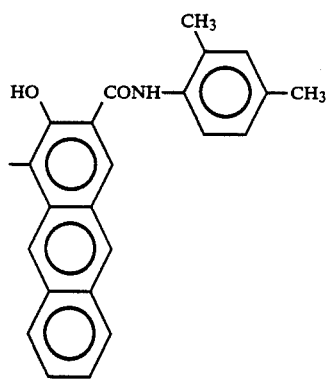
A-43
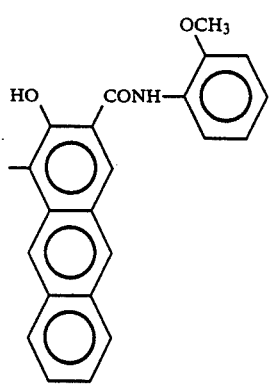
A-44
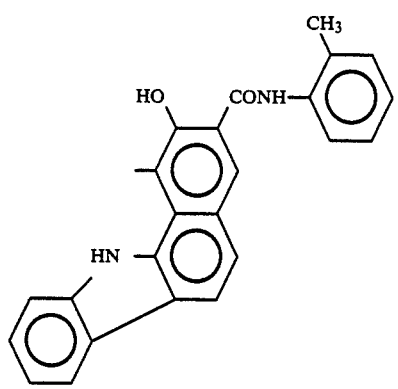
A-45
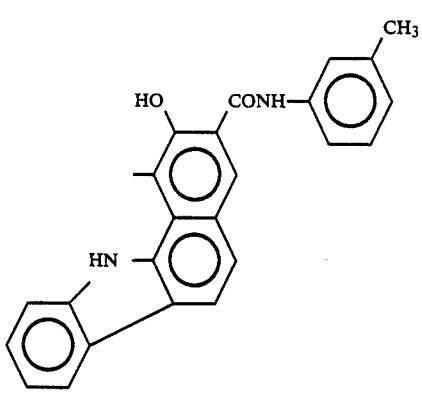
A-46
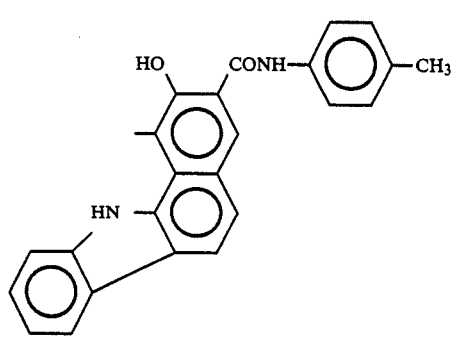
A-47
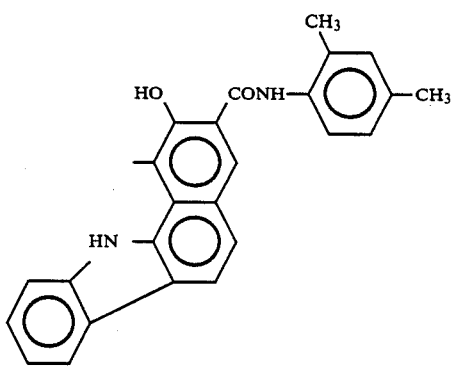
A-48

-continued
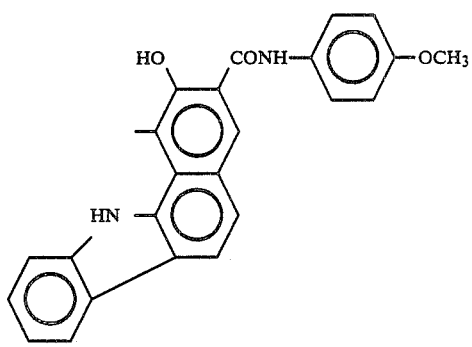
A-49
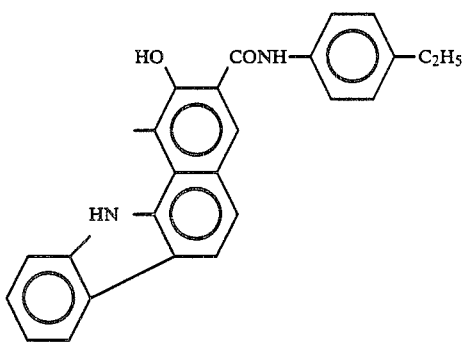
A-50
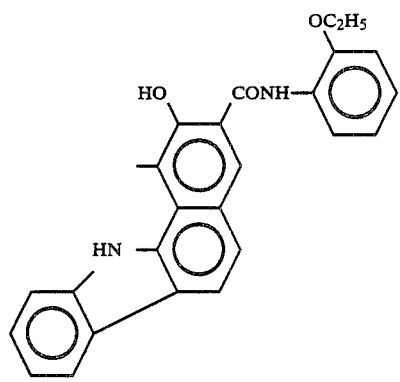
A-51
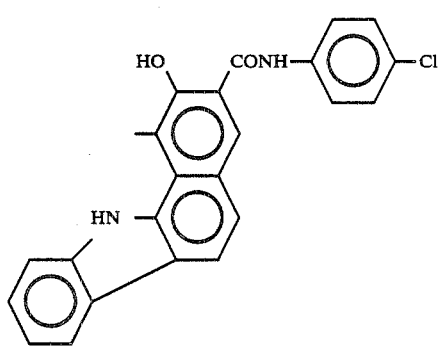
A-52
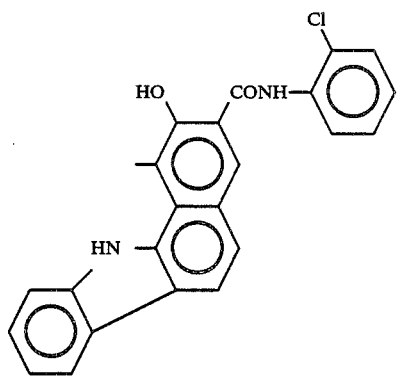
A-53
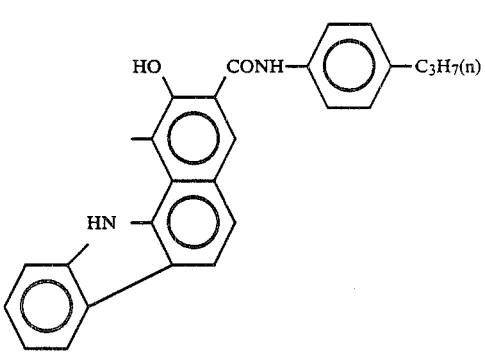
A-54
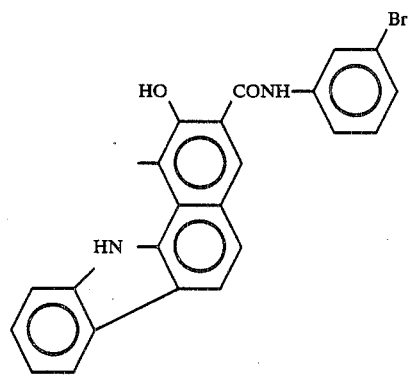
A-55
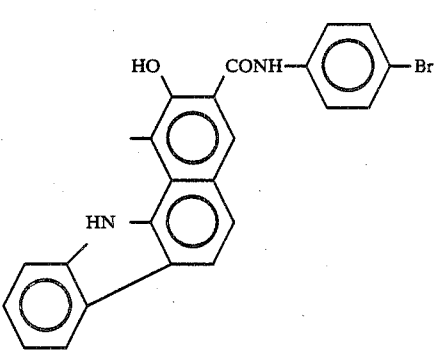
A-56

-continued
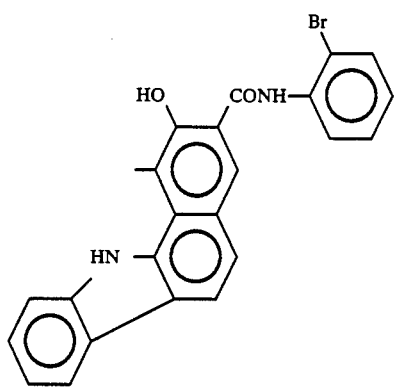 A-57
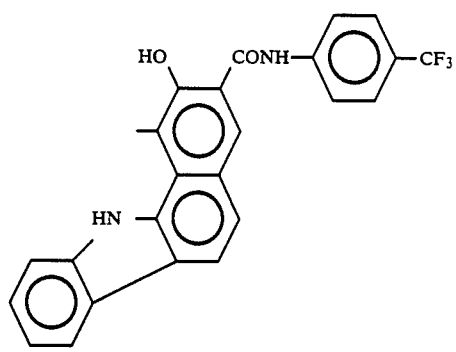 A-58
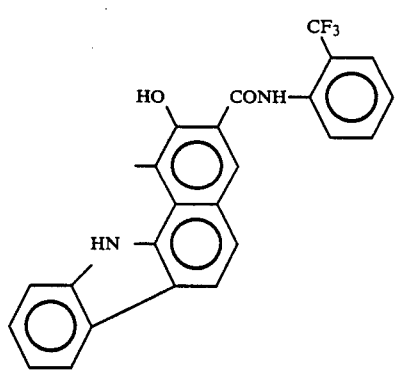 A-59
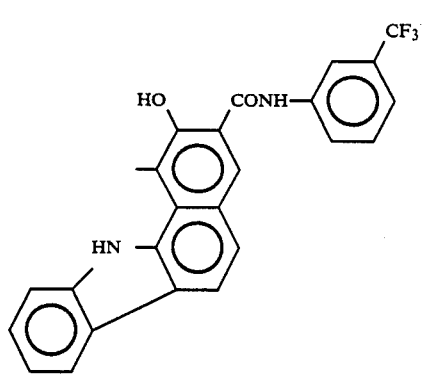 A-60
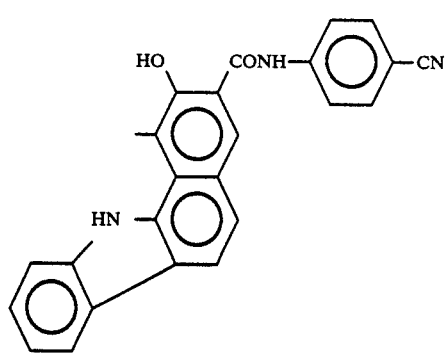 A-61
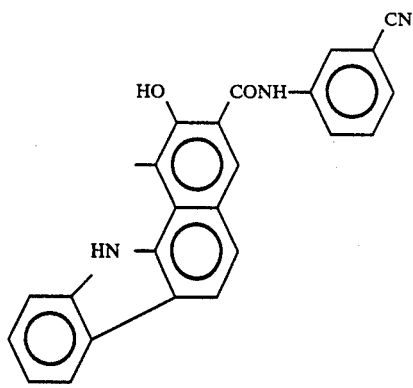 A-62
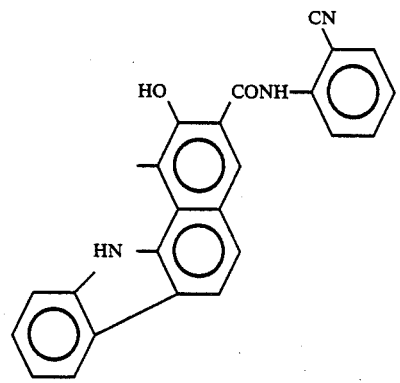 A-63
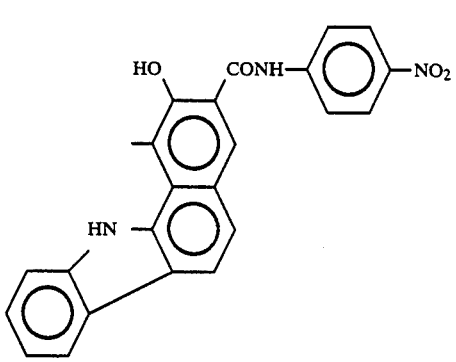 A-64

-continued
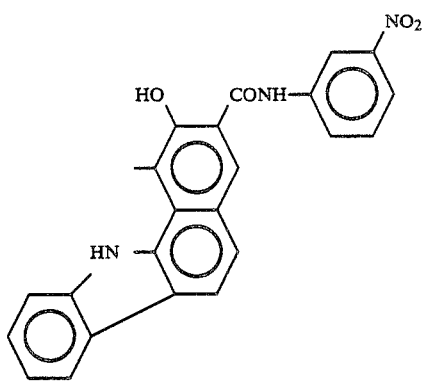 A-65
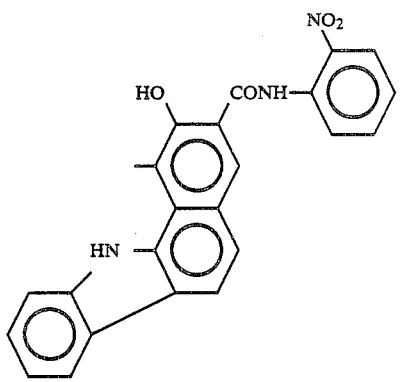 A-66
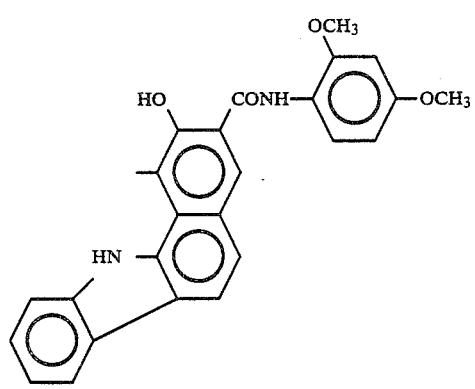 A-67
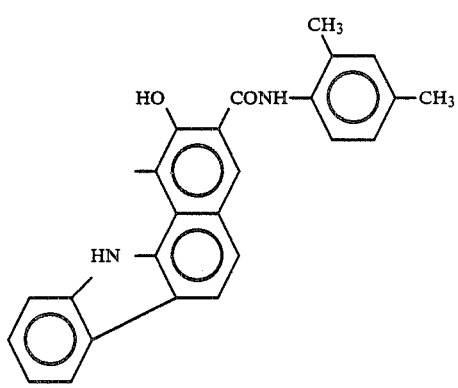 A-68
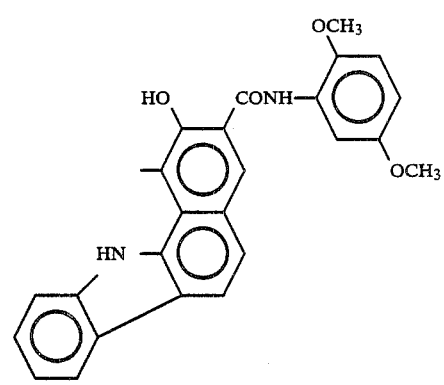 A-69
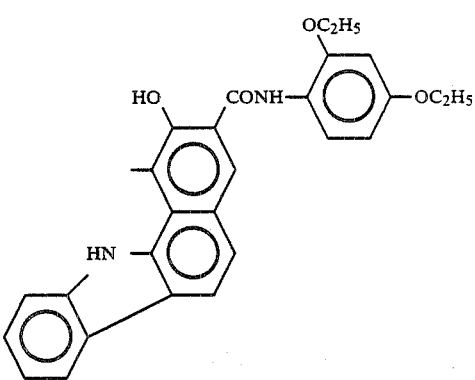 A-70
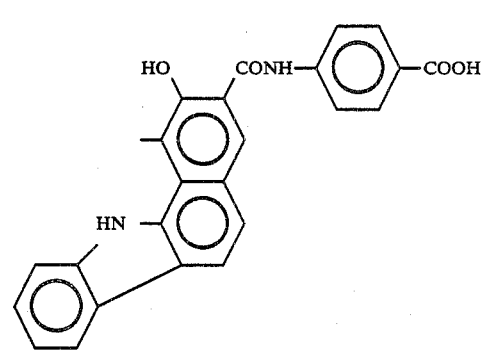 A-71
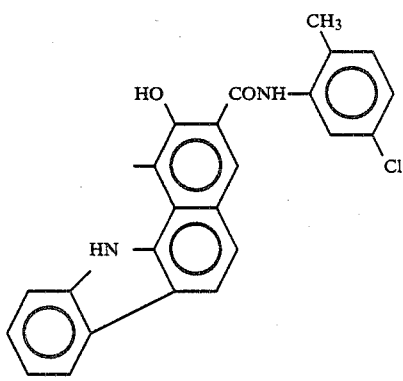 A-72

-continued
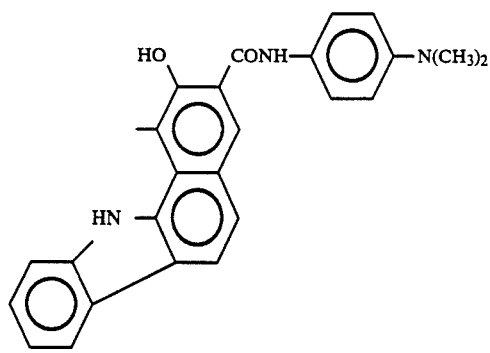
A-73
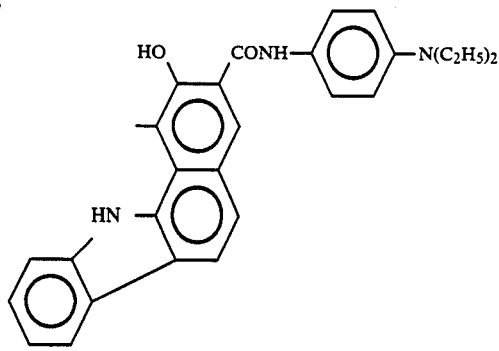
A-74
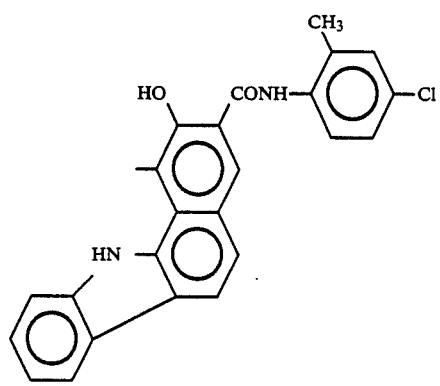
A-75
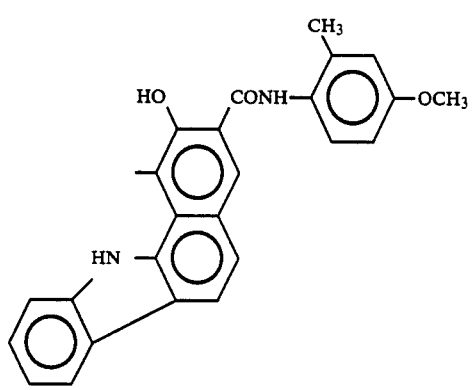
A-76
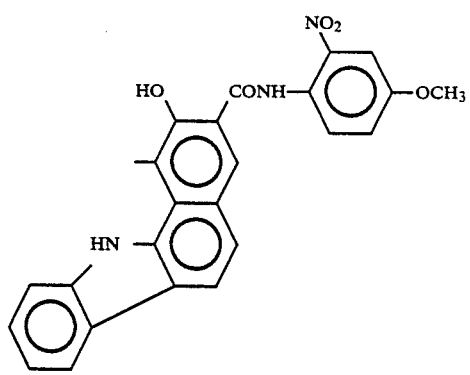
A-77
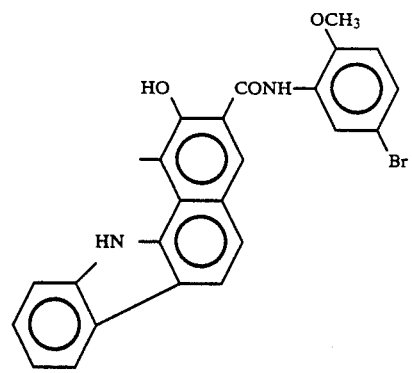
A-78
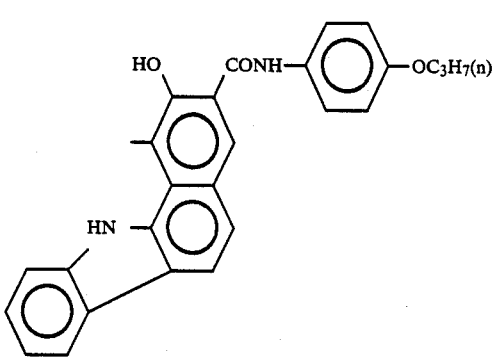
A-79
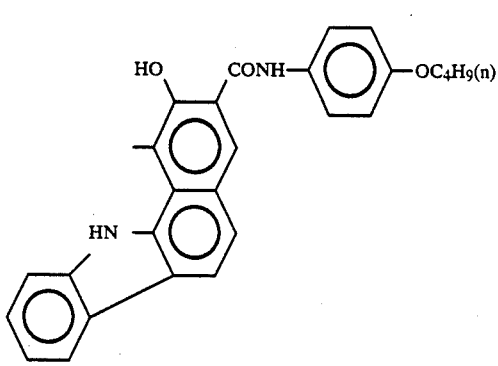
A-80

-continued
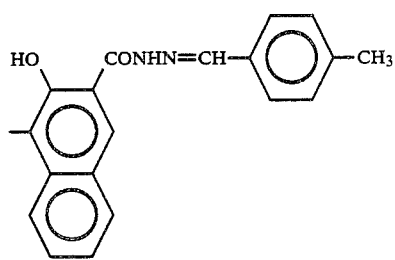
A-81
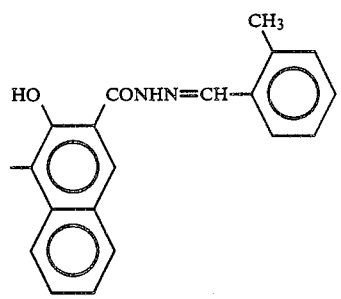
A-82
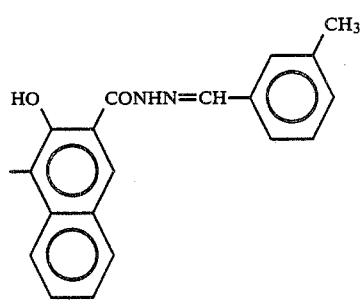
A-83
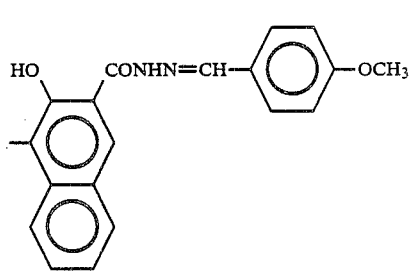
A-84
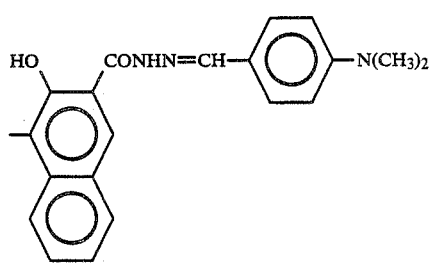
A-85
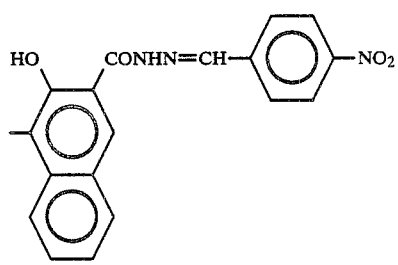
A-86
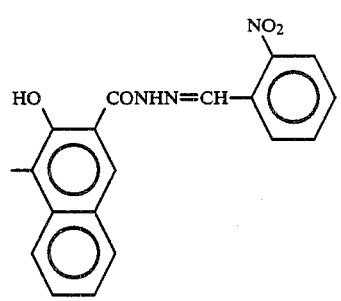
A-87
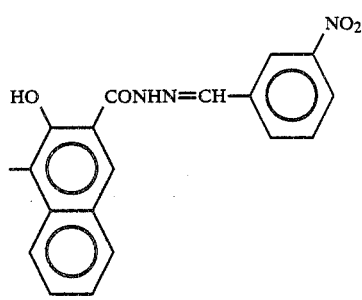
A-88
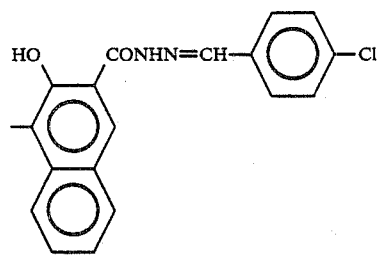
A-89
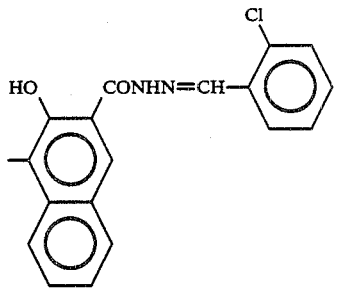
A-90

-continued
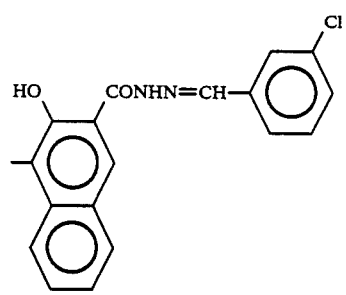
A-91
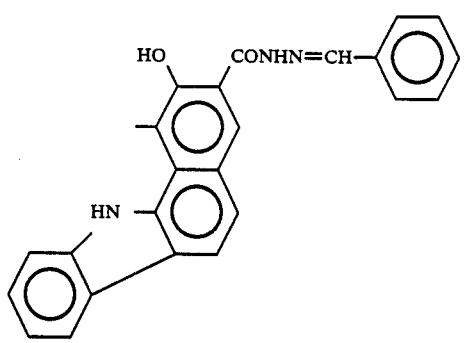
A-92
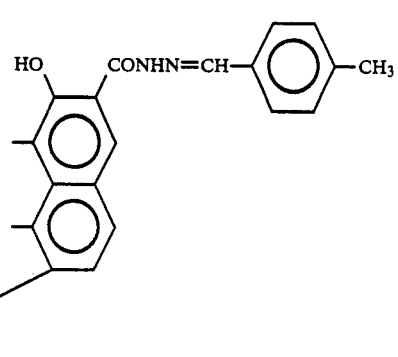
A-93
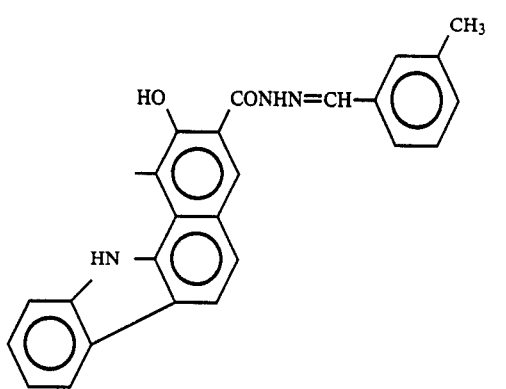
A-94
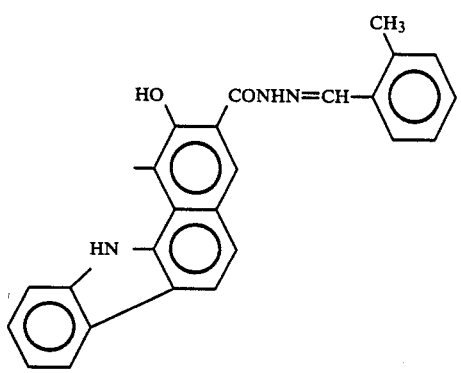
A-95
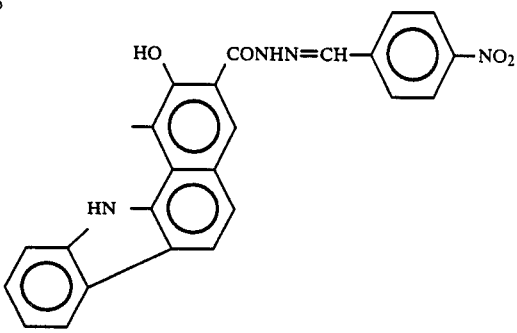
A-96
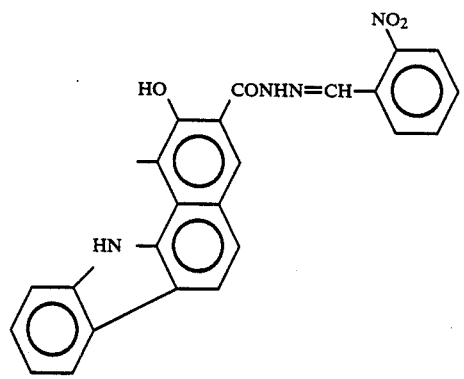
A-97
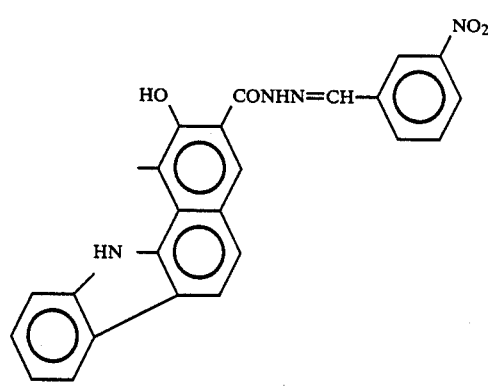
A-98

-continued
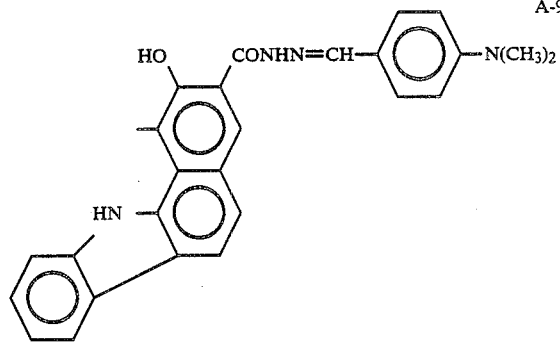
A-99
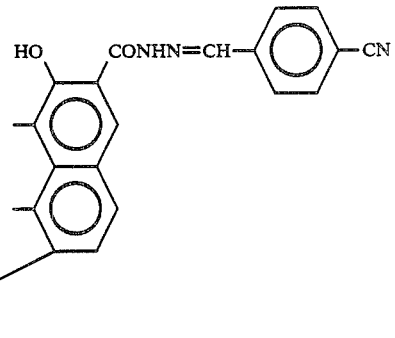
A-100
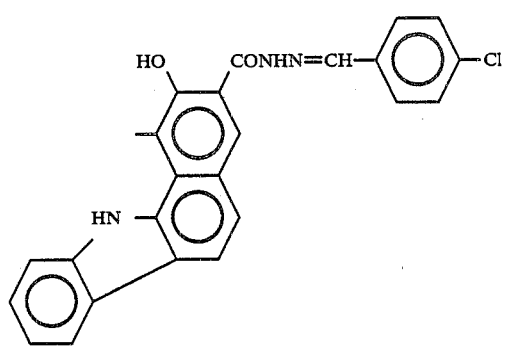
A-101
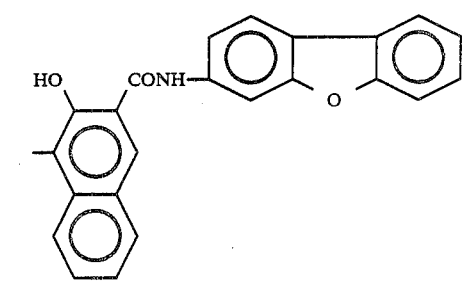
A-102
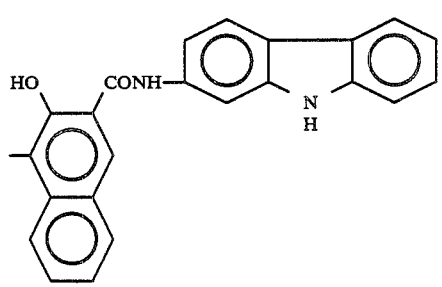
A-103
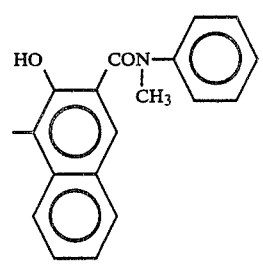
A-104
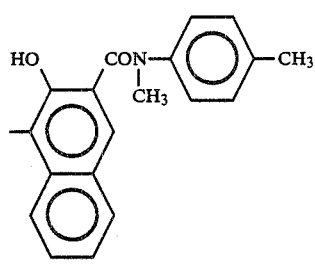
A-105
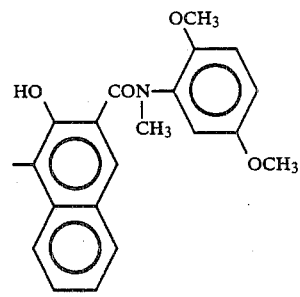
A-106
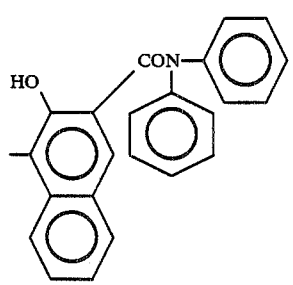
A-107
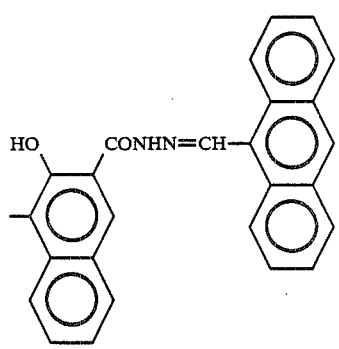
A-108

-continued
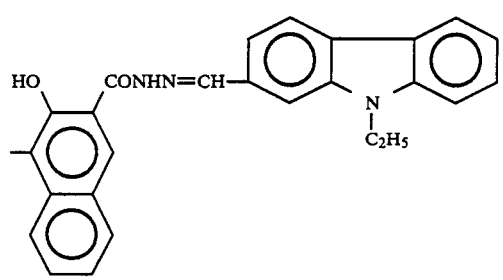 A-109
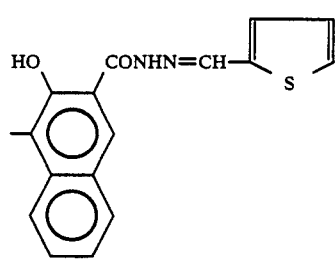 A-110
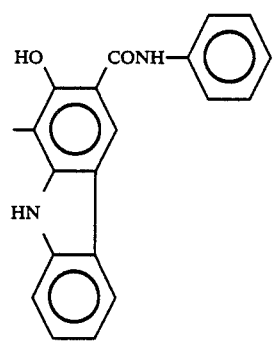 A-111
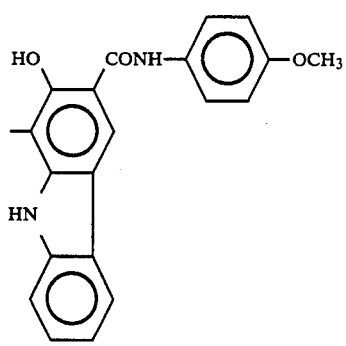 A-112
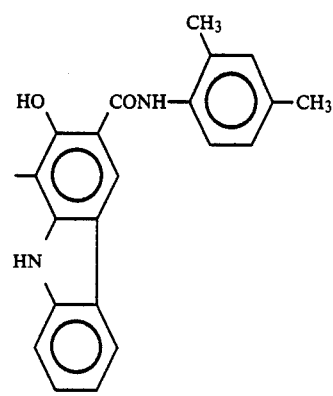 A-113
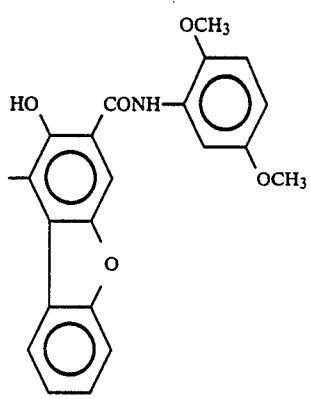 A-114
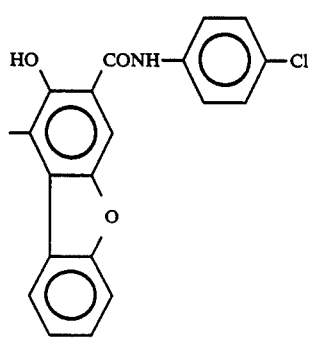 A-115
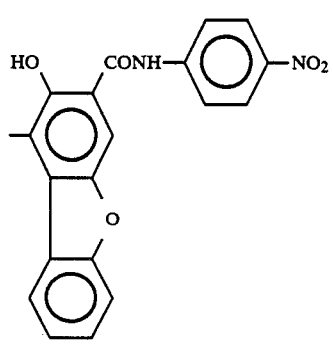 A-116
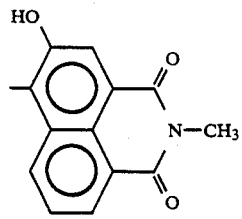 A-117
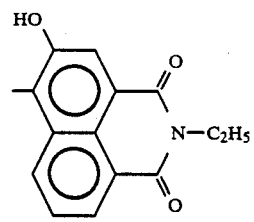 A-118

-continued
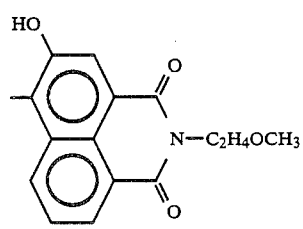 A-119
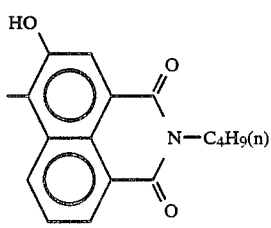 A-120
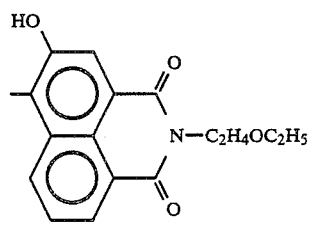 A-121
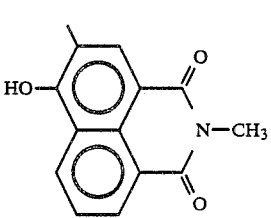 A-122
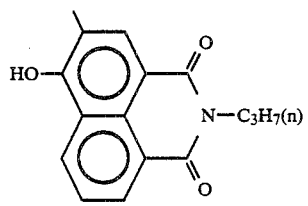 A-123
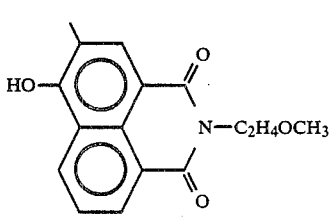 A-124
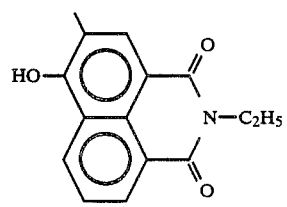 A-125
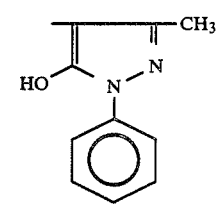 A-126
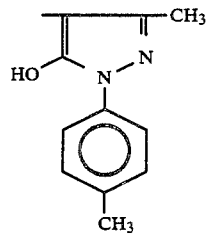 A-127
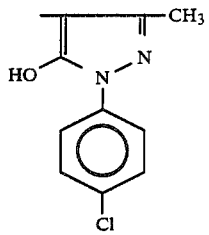 A-128
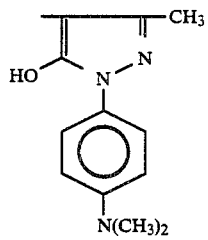 A-129
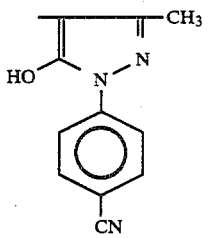 A-130
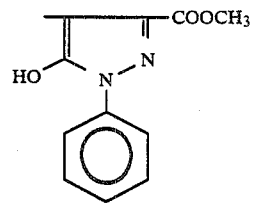 A-131
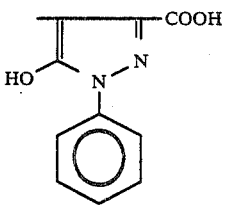 A-132

-continued
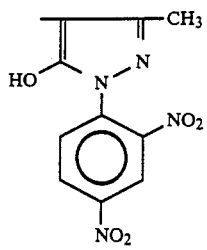 A-133
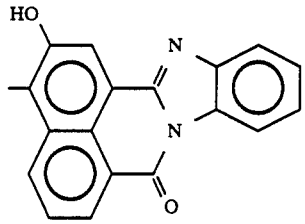 A-134
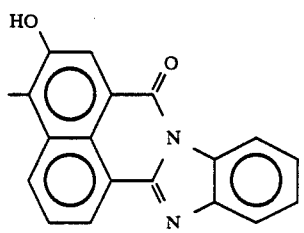 A-135
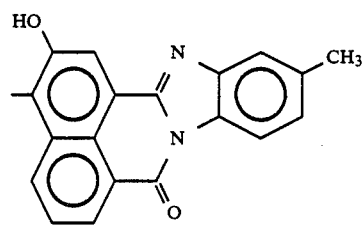 A-136
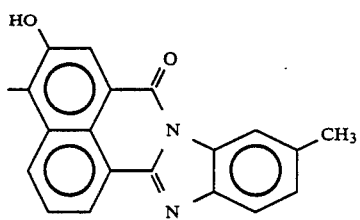 A-137
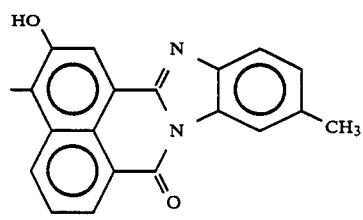 A-138
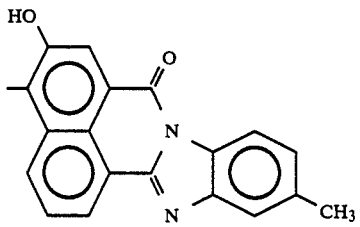 A-139
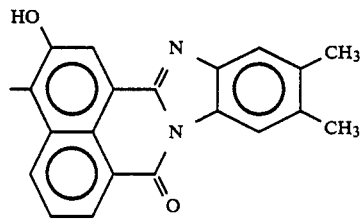 A-140
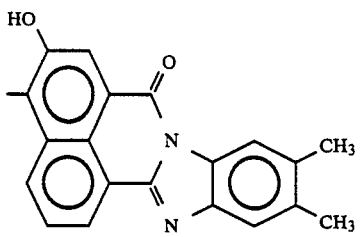 A-141
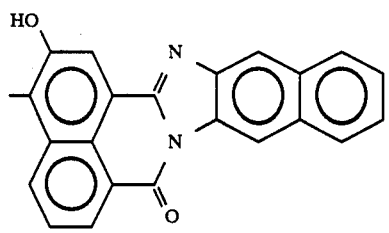 A-142
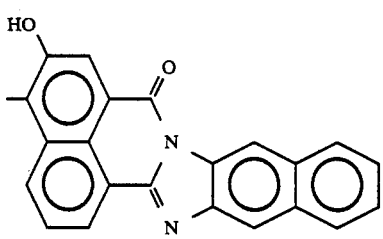 A-143
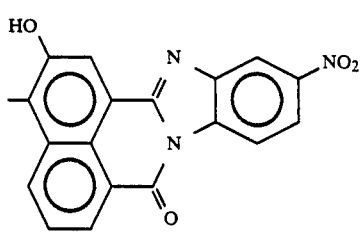 A-144
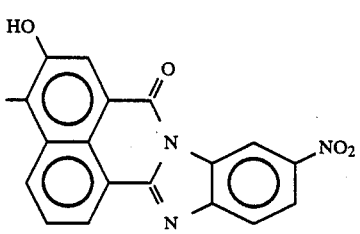 A-145
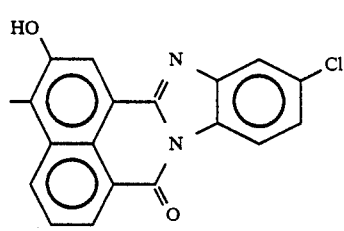 A-146

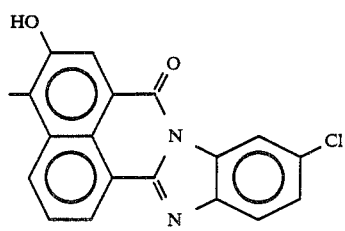
A-147

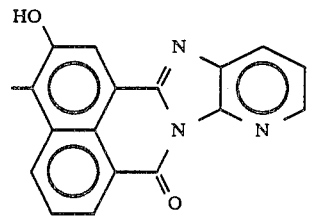
A-148

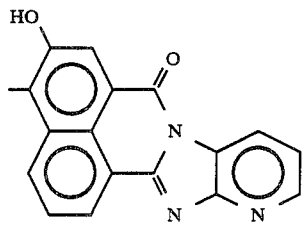
A-149

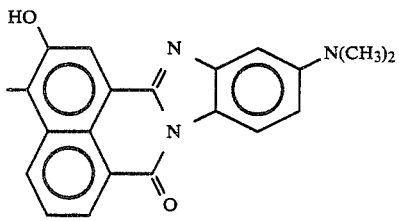
A-150

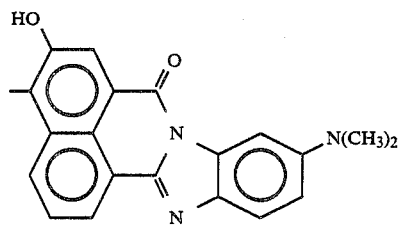
A-151

Among the coupler residua exemplified above, those represented by the general formula (II) are most preferred because they have high photosensitivity, their intermediates are readily available as raw materials and they can be produced at low costs.

Further specific examples of the azo compound useful in the practice of this invention, are those represented by the following structural formula;

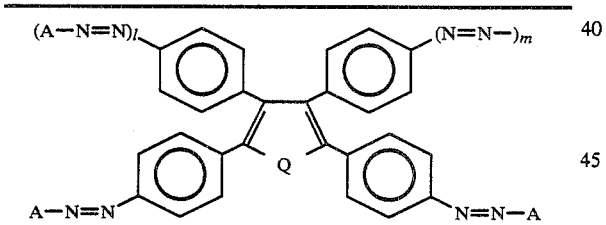

| Exemplified Compound No. | A | Q | l | m |
|---|---|---|---|---|
| 1 | A-1 | S | 0 | 0 |
| 2 | A-49 | S | 0 | 0 |
| 3 | A-4 | S | 0 | 0 |
| 4 | A-20 | S | 0 | 0 |
| 5 | A-8 | S | 0 | 0 |
| 6 | A-52 | S | 0 | 0 |
| 7 | A-67 | S | 0 | 0 |
| 8 | A-5 | S | 0 | 0 |
| 9 | A-17 | S | 0 | 0 |
| 10 | A-64 | S | 0 | 0 |
| 11 | A-80 | S | 0 | 0 |
| 12 | A-81 | S | 0 | 0 |
| 13 | A-103 | S | 0 | 0 |
| 14 | A-117 | S | 0 | 0 |
| 15 | A-134 | S | 0 | 0 |
| 16 | A-138 | S | 0 | 0 |
| 17 | A-22 | S | 0 | 0 |
| 18 | A-84 | S | 0 | 0 |
| 19 | A-102 | S | 0 | 0 |
| 20 | A-105 | S | 0 | 0 |
| 21 | A-119 | S | 0 | 0 |
| 22 | A-127 | S | 0 | 0 |

-continued

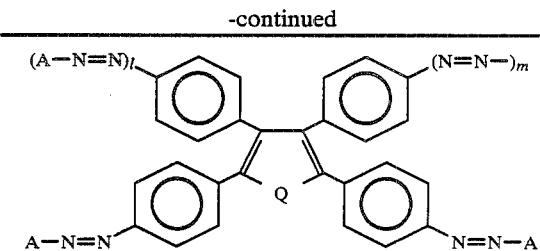

| Exemplified Compound No. | A | Q | l | m |
|---|---|---|---|---|
| 23 | A-137 | S | 0 | 0 |
| 24 | A-23 | S | 0 | 0 |
| 25 | A-86 | S | 0 | 0 |
| 26 | A-92 | S | 0 | 0 |
| 27 | A-126 | S | 0 | 0 |
| 28 | A-135 | S | 0 | 0 |
| 29 | A-1 | $\diagdown SO_2 \diagup$ | 0 | 0 |
| 30 | A-9 | $\diagdown SO_2 \diagup$ | 0 | 0 |
| 31 | A-21 | $\diagdown SO_2 \diagup$ | 0 | 0 |
| 32 | A-40 | $\diagdown SO_2 \diagup$ | 0 | 0 |

-continued
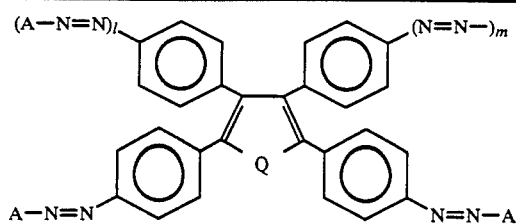
| Exemplified Compound No. | A | Q | l | m |
|---|---|---|---|---|
| 33 | A-49 | \SO₂/ | 0 | 0 |
| 34 | A-53 | \SO₂/ | 0 | 0 |
| 35 | A-84 | \SO₂/ | 0 | 0 |
| 36 | A-98 | \SO₂/ | 0 | 0 |
| 37 | A-120 | \SO₂/ | 0 | 0 |
| 38 | A-135 | \SO₂/ | 0 | 0 |
| 39 | A-1 | S | 0 | 1 |
| 40 | A-7 | S | 0 | 1 |
| 41 | A-8 | S | 0 | 1 |
| 42 | A-20 | S | 0 | 1 |
| 43 | A-32 | S | 0 | 1 |
| 44 | A-42 | S | 0 | 1 |
| 45 | A-49 | S | 0 | 1 |
| 46 | A-53 | S | 0 | 1 |
| 47 | A-88 | S | 0 | 1 |
| 48 | A-92 | S | 0 | 1 |
| 49 | A-118 | S | 0 | 1 |
| 50 | A-135 | S | 0 | 1 |
| 51 | A-1 | \SO₂/ | 0 | 1 |
| 52 | A-7 | \SO₂/ | 0 | 1 |
| 53 | A-9 | \SO₂/ | 0 | 1 |
| 54 | A-21 | \SO₂/ | 0 | 1 |
-continued
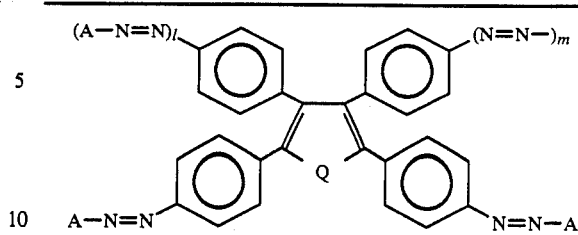
| Exemplified Compound No. | A | Q | l | m |
|---|---|---|---|---|
| 55 | A-40 | \SO₂/ | 0 | 1 |
| 56 | A-49 | \SO₂/ | 0 | 1 |
| 57 | A-52 | \SO₂/ | 0 | 1 |
| 58 | A-65 | \SO₂/ | 0 | 1 |
| 59 | A-134 | \SO₂/ | 0 | 1 |
| 60 | A-135 | \SO₂/ | 0 | 1 |
| 61 | A-1 | S | 1 | 1 |
| 62 | A-5 | S | 1 | 1 |
| 63 | A-9 | S | 1 | 1 |
| 64 | A-12 | S | 1 | 1 |
| 65 | A-21 | S | 1 | 1 |
| 66 | A-28 | S | 1 | 1 |
| 67 | A-40 | S | 1 | 1 |
| 68 | A-49 | S | 1 | 1 |
| 69 | A-53 | S | 1 | 1 |
| 70 | A-84 | S | 1 | 1 |
| 71 | A-89 | S | 1 | 1 |
| 72 | A-118 | S | 1 | 1 |
| 73 | A-134 | S | 1 | 1 |
| 74 | A-135 | S | 1 | 1 |
| 75 | A-1 | \SO₂/ | 1 | 1 |
| 76 | A-2 | \SO₂/ | 1 | 1 |
| 77 | A-9 | \SO₂/ | 1 | 1 |

-continued

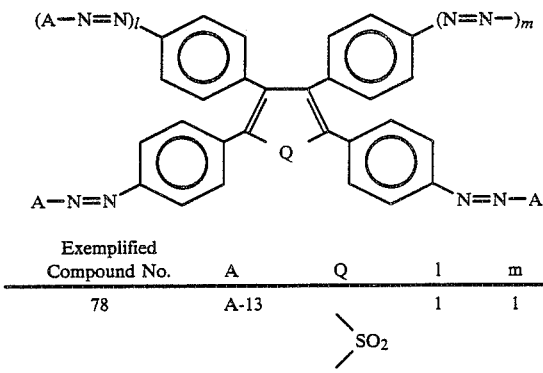

| Exemplified Compound No. | A | Q | l | m |
|---|---|---|---|---|
| 78 | A-13 | \SO₂/ | 1 | 1 |
| 79 | A-18 | \SO₂/ | 1 | 1 |
| 80 | A-20 | \SO₂/ | 1 | 1 |
| 81 | A-42 | \SO₂/ | 1 | 1 |
| 82 | A-49 | \SO₂/ | 1 | 1 |
| 83 | A-53 | \SO₂/ | 1 | 1 |
| 84 | A-81 | \SO₂/ | 1 | 1 |
| 85 | A-90 | \SO₂/ | 1 | 1 |
| 86 | A-92 | \SO₂/ | 1 | 1 |
| 87 | A-119 | \SO₂/ | 1 | 1 |
| 88 | A-122 | \SO₂/ | 1 | 1 |
| 89 | A-134 | \SO₂/ | 1 | 1 |

-continued

| Exemplified Compound No. | A | Q | l | m |
|---|---|---|---|---|
| 90 | A-135 | \SO₂/ | 1 | 1 |

These exemplified compounds can be prepared in a manner known per se in the art. For example, they can each be prepared with ease by diazotizing an amine compound represented by the following general formula (VIII):

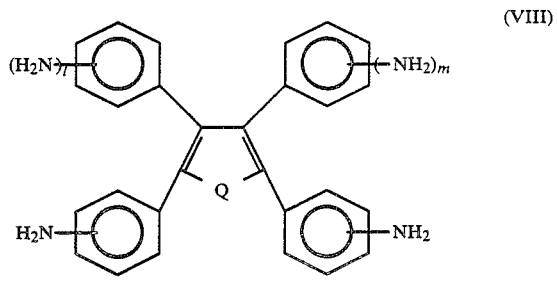

(VIII)

wherein Q, l and m have the same meaning as defined in the general formula (I), and then coupling the diazotized compound, either as is or after its isolation as the borofluoride, with one of the abovedescribed coupler compounds.

The electrophotographic photoreceptor of this invention contains at least one azo compound, which is represented by the general formula (I), as a charge-generating material in a photoconductive layer on an electrically-conductive base. Typical constructions of such a photoreceptor are illustrated respectively in FIGS. 5 and 6. The photoreceptor of FIG. 5 is a dispersion-type photoreceptor, in which a photosensitive layer 4 containing a charge-generating material 2 and a charge-transporting material 3, both dispersed in a binder, is provided on an electrically-conductive base 1. The photoreceptor of FIG. 6 is a laminated photoreceptor which includes, on an electrically-conductive base 1, a charge-generating layer 6 with a charge-generating material dispersed in a binder and a charge-transporting layer 5 with a charge-transporting material dispersed in a binder.

There are also photoreceptors similar to the aforementioned laminated photoreceptor except that the positions of the charge-generating layer and charge-transporting layer are reversed, photoreceptors with intermediate layers between their respective photosensitive layers and electrically-conductive bases, etc.

In the photoreceptor of FIG. 6, light which has been obtained subsequent to exposure of a picture or mark transmits through the charge-transporting layer, whereby the charge-generating material generates charges in the charge-generating layer. The thus-produced charges are charged into the charge-transporting layer, so that the charge-transporting material performs their transportation.

The electrophotographic photoreceptor of this invention is composed of an electrically-conductive base, a binder, a charge transporting material and the like in addition to the azo compound of the general formula (I). No particular limitation is however imposed on other components or elements of the photoreceptor so long as they have functions as components or elements for photoreceptors.

Illustrative examples of the electrically-conductive base useful in the practice of this invention, are metal plates such as aluminum, copper and zinc plates, those obtained by depositing an electrically-conductive material such as aluminum or $SnO_2$ on plastic sheets or films such as polyester sheets or films, and paper rendered electrically conductive.

As binders, may be used vinyl polymers such as polystyrene, polyacrylamide and poly-N-vinylcarbazole as well as condensation polymers such as polyamide resins, polyester resins, epoxy resins, phenoxy resins and polycarbonate resins. Any resins may be used as binders, so long as they are electrically insulating and have close adhesion to bases.

Charge-transporting materials may generally be classified into two kinds, one being hole-transporting materials and the other electron-transporting materials. In the photoreceptor of this invention, both kinds of charge-transporting materials can be used. In addition to electron-receptive materials having the ability to transport electrons, such as trinitrofluorenone and tetranitrofluorenone, the following materials are examples of hole-transporting materials: electron-donative materials having ability to transport holes, such as polymers containing heterocyclic compounds typified by poly-N-vinylcarbazole; triazole derivatives; oxadiazole derivatives; imidazole derivatives; pyrazoline derivatives; polyarylalkane derivatives; phenylenediamine derivatives; hydrazone derivatives; amino-substituted chalcon derivatives; triarylamine derivatives; carbazole derivatives; and stilbene derivatives.

Other examples are 9-ethylcarbazole-3-aldehyde-1-methyl-1-phenylhydrazone, 9-ethylcarbazole-3-aldehyde-1-benzyl-1-phenylhydrazone, 9-ethylcarbazole-3-aldehyde-1,1-diphenylhydrazone, 4-diethylaminostyrene-$\beta$-aldehyde-1-methyl-1-phenylhydrazone, 4-methoxynaphthalene-1-aldehyde-1-benzyl-1-phenylhydrazone, 4-methoxybenzaldehyde-1-methyl-1-phenylhydrazone, 2,4-dimethoxybenzaldehyde-1-benzyl-1-phenylhydrazone, 4-diethylaminobenzaldehyde-1,1-diphenylhydrazone, 4-methoxybenzaldehyde-1-benzyl-1-(4-methoxy)phenylhydrazone, 4-diphenylaminobenzaldehyde-1-benzyl-1-phenylhydrazone, 4-dibenzylaminobenzaldehyde-1,1-diphenylhydrazone, 1,1-bis(4-dibenzylaminophenyl)propane, tris(4-diethylaminophenyl)methane, 1,1-bis(4-dibenzylaminophenyl)propane, 2,2'-dimethyl-4,4'-bis(diethylamino)-triphenylmethane, 9-(4-diethylaminostyryl)anthracene, 9-bromo-10-(4-diethylaminostyryl)anthracene, 9-(4-dimethylaminobenzylidene)fluorene, 3-(9-fluorenylidene)-9-ethylcarbazole, 1,2-bis(4-diethylaminostyryl)benzene, 1,2-bis(2,4-dimethoxystyryl)benzene, 3-styryl-9-ethylcarbazole, 3-(4-methoxystyryl)-9-ethylcarbazole, 4-diphenylaminostilbene, 4-dibenzylaminostilbene, 4-ditolylaminostilbene, 1-(4-diphenylaminostyryl)naphthalene, 1-(4-diethylaminostyryl)naphthalene, 4'-diphenylamino-$\alpha$-phenylstilbene, 4'-methylphenylamino-$\alpha$-phenylstilbene, 1-phenyl-3-(4-diethylaminostyryl)-5-(4-diethylaminophenyl)pyrazoline, and 1-phenyl-3-(4-dimethylaminostyryl)-5-(4-dimethylaminophenyl)pyrazoline.

Other examples of hole-transporting materials, are 2,5-bis(4-diethylaminophenyl)-1,3,4-oxadiazole, 2,5-bis[4-(4-diethylaminostyryl)phenyl]-1,3,4-oxadiazole, 2-(9-ethylcarbazolyl-3-)-5-(4-diethylaminophenyl)-1,3,4-oxadiazole, 2-vinyl-4-(2-chlorophenyl)-5-(4-diethylaminophenyl)oxazole, 2-(4-diethylaminophneyl)-4-phenyloxazole, 9-[3-(4-diethyl-aminophenyl)-2-propenylidene]-9H-xanthene, poly-N-vinylcarbazole, halogenated poly-N-vinylcarbazoles, polyvinylpyrene, polyvinylanthracene, pyrene-formaldehyde resins, and ethylcarbazole-formaldehyde resins.

Examples of electron-transporting materials, are chloroanil, bromoanil, tetracyano-ethylene, tetracyanoquinodimethane, 2,4,7-trinitro-9-fluorenone, 2,4,5,7-tetranitro-9-fluorenone, 2,4,5,7-tetranitoxanthone, 2,4,8-trinitrothioxanthone, 2,6,8-trinitro-4H-indino[1,2-b]thiophen-4-one, and 1,3,7-trinitrodibenzothiophene-5,5-dioxide.

These charge-transporting materials may be used either singly or in combination.

Between the photosensitive layer and the electrically-conductive layer, an intermediate layer may be provided as needed. Polyamide, nitrocellulose, casein, polyvinyl alcohol or the like is suitable as its material. The thickness of the intermediate layer preferably is 1 $\mu$m or less.

For the fabrication of the photoreceptor, conventionally-known processes may be used. In the case of a laminated photoreceptor, fine particles of an azo compound is dispersed in a solution in which a binder has been dissolved in advance. The resultant coating formulation is applied onto an electrically-conductive base and is then dried to obtain a charge-generating layer. Thereafter, a solution with a charge-transporting material and a binder dissolved therein is coated and then dried to form a charge-transporting layer. Other methods may also be used to form such a charge-producing layer. For example, an azo pigment may be applied by vacuum evaporation. Alternatively, a solution of an azo pigment may be coated and then dried. The former method is however accompanied by a drawback that the fabrication cost is high. The latter method involves drawbacks in operation, because it uses an organic amine which is generally inconvenient to handle, e.g., ethylenediamine or n-butylamine. It is therefore suitable to coat a dispersion of fine particles of an azo compound. The coating may be effected by a conventional method, for example, by the doctor blade method, dipping method or wire bar method.

The optimal thickness range of each photosensitive layer varies depending on the kind of the associated photoreceptor. For example, the thickness preferably is 3–50 $\mu$m with 5–30 $\mu$m being more preferable in the case of such a photoreceptor as shown in FIG. 5.

In the case of a photoreceptor such as that shown in FIG. 6, the thickness of the charge-generating layer 6 preferably is 0.01–5 $\mu$m with 0.05–2 $\mu$m being more preferred. If this thickness is less than 0.01 $\mu$m, the generation of charges is not sufficient. On the other hand, thicknesses greater than 5 $\mu$m are not preferred from a practical viewpoint since such large thicknesses lead to high residual potentials. Further, the thickness of the charge-transporting layer 5 preferably is 3–50 $\mu$m with 5–30 μm being more preferred. Any thicknesses smaller than 3 μm cannot achieve a sufficient charge level, whereas any thicknesses greater than 50 μm are not preferable from a practical viewpoint because large thicknesses lead to high residual potentials.

The content of the azo compound of the general formula (I) in the photosensitive layer varies in accordance with the kind of each photoreceptor. In the case of such a photoreceptor as shown in FIG. 5, the azo compound may be contained preferably in an amount of 50 wt.% or less, more preferably, in an amount of 20 wt.% or less in the photosensitive layer 4. Further, a charge-transporting material is also added preferably in a proportion of 10–95 wt.%, more preferably, in a proportion of 30–90 wt.% to the photosensitive layer 4. In the case of such a photoreceptor as depicted in FIG. 6, the proportion of the azo compound in the charge-generating layer 5 preferably is at least 30 wt.% with at least 50 wt.% being more preferred. In addition, 10–95 wt.%, preferably 30–90 wt.%, of a charge-transporting material is incorporated in the charge-transporting layer. If the content of the charge-transporting material in this layer is less than 10 wt.%, the transportation of charges is not effected substantially. On the other hand, any amounts in excess of 95 wt.% are not preferable from a practical viewpoint because the mechanical strength of the photoreceptor is reduced.

Owing to the use of the azo compound having the tetraphenylthiophene or tetraphenenylthiophene-1,1-dioxide skeleton as a charge-generating material, a electrophotographic photoreceptor of this invention is easy to fabricate and has excellent properties, e.g., its sensitivity is high and its performance does not deteriorate through repeated use.

The present invention will hereinafter be described specifically by the following Examples. It should however be borne in mind that embodiments of this invention are not limited to or by the following Examples.

PREPARATION EXAMPLE 1

In a solution consisting of 400 ml of water and 36 ml of 35% hydrochloric acid, 3.8 g of 2,5-bis(4-aminophenyl)-3,4-diphenylthiophene was dispersed. After stirring the dispersion at 60° C. for 1 hour, the dispersion was cooled to 0° C., to which a solution of 1.8 g of sodium nitrite dissolved in 20 ml of water was added dropwise over 30 minutes. The resultant mixture was stirred at 0°–5° C. for 3 hours. After removing the insoluble matter, 20 ml of 42% borofluoric acid was added. The precipitated crystals were collected by filtration, washed with water and then dried, thereby obtaining 4.4 g of tetrazonium difluoroborate (yield: 78%).

Dissolved next in 200 ml of N,N-dimethylformamide were 2.5 g of the above-obtained tetrazonium difluoroborate and 2.1 g of 2-hydroxy-3-naphthoic anilide, followed by a dropwise addition of a solution of 2.0 g of sodium acetate and 30 ml of water at 0°–5° C. over 30 minutes. After stirring the reaction mixture for 2 hours at the same temperature, the temperature of the reaction mixture was allowed to rise to room temperature and the reaction mixture was stirred overnight. The precipitated crystals were collected by filtration, dispersed into 300 ml of N,N-dimethylformamide, and collected again by filtration. After repeating this dispersion 5 times, an operation consisting of dispersion into 500 ml of water and subsequent collection by filtration was repeated 5 times. The crystals were then dried to obtain 2.9 g of the disazo compound of Exemplified Compound No. 1 (yield: 73.9%). The thus-obtained powder had a bluish black color and did not melt up to 300° C. It was confirmed to be the intended product from its elemental analysis data and infrared absorption spectrum (measured by the KBr method; hereinafter called "IR absorption spectrum").

Elemental analysis:

|  | C | H | N | S |
| --- | --- | --- | --- | --- |
| Found (%) | 77.15 | 4.32 | 8.62 | 3.34 |
| Calculated (%) | 77.02 | 4.35 | 8.70 | 3.31 |

IR absorption spectrum: Absorption based on $>C=O$: 1682 cm$^{-1}$.

The IR absorption spectrum (measured by the KBr method) is shown in FIG. 1.

PREPARATION EXAMPLE 2

After dissolving 2.0 g of a benzocarbazole compound represented by the following structural formula:

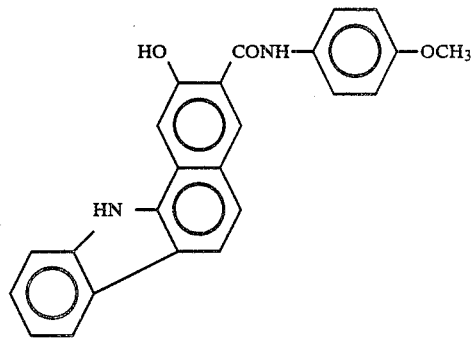

in 200 ml of N,N-dimethylformamide, a solution of 2.9 g of sodium acetate in 10 ml of water was added and the resultant mixture was cooled at 0° C.

A 1.6 g portion of the tetrazonium fluoroborate synthesized in Preparation Example 1 was dissolved in 100 ml of N,N-dimethylformamide which contained 0.5 ml of 35% hydrochloric acid, followed by a dropwise addition of the above-described coupler solution at 0°–5° C. in the course of 30 minutes. After stirring the reaction mixture at the same temperature for 3 hours, the temperature of the reaction mixture was allowed to rise to room temperature and the reaction mixture was stirred overnight. The precipitated crystals were collected by filtration, followed by their washing 4 times with 200 ml of N,N-dimethylformamide and 3 times with 300 ml of water. The crystals were then dried to obtain 1.9 g of the disazo compound of Exemplified Compound No. 2 (yield: 60.7%). The thus-obtained powder had a bluish color and did not melt up to 300° C. It was confirmed to be the intended product from its elemental analysis data and IR absorption spectrum (measured by the KBr method).

Elemental analysis:

|  | C | H | N | S |
| --- | --- | --- | --- | --- |
| Found (%) | 75.62 | 4.13 | 9.45 | 2.64 |
| Calculated (%) | 75.75 | 4.32 | 9.30 | 2.66 |

IR absorption spectrum: Absorption based on $>C=O$: 1662 cm$^{-1}$.

Figure 2:
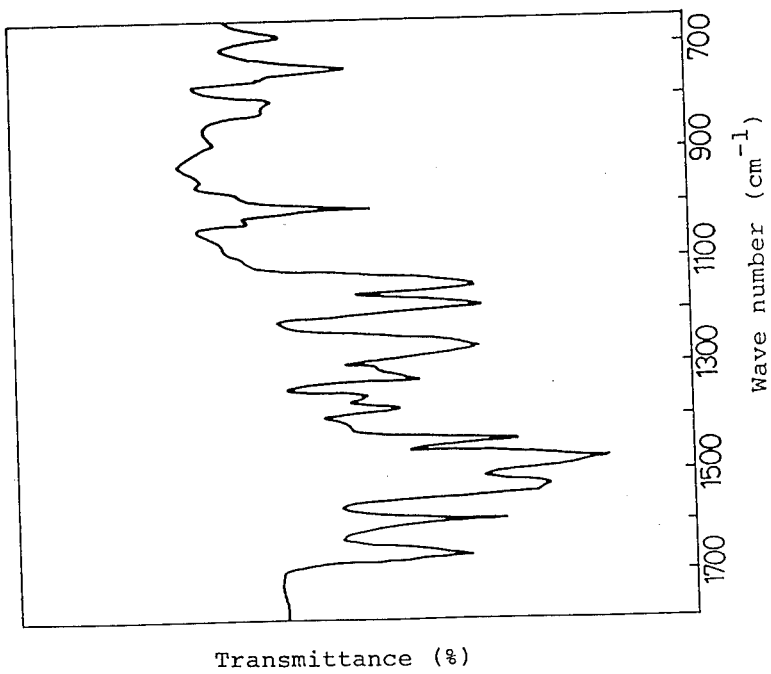

The IR absorption spectrum (measured by the KBr method) is shown in FIG. 2.

PREPARATION EXAMPLE 3

In a solution consisting of 17 ml of 35% hydrochloric acid and 1 l of water, 20 g of 2,5-bis(4-aminophenyl)-3,4-diphenylthiophene-1,1-dioxide was dispersed. After stirring the dispersion at room temperature for 3 hours, a solution of 18.4 g of sodium nitrite in 30 ml of water was added dropwise at 0° C. After stirring the reaction mixture for 3 hours at the same temperature, the insoluble matter was removed, followed by an addition of 100 ml of 42% borofluoric acid. The precipitated crystals were collected by filtration, washed with water and dried, thereby obtaining 24.9 g of a tetrazonium salt (yield: 87.3%).

A 10 g portion of the tetrazonium salt and 8.5 g of 2-hydroxy-3-naphthoic anilide were dissolved in 1.5 l of N,N-dimethylformamide, followed by a dropwise addition of 100 ml of a 5% aqueous solution of sodium acetate at 5° C. At the same temperature, the reaction mixture was stirred for 2 hours. After stirring it at room temperature for further 5 hours, the precipitated crystals were collected by filtration, dispersed into 500 ml of N,N-dimethylformamide, and collected again by filtration. After repeating this dispersion twice, an operation consisting of dispersion into 1 l of water and subsequent collection by filtration was repeated 4 times. The crystals were then dried to obtain 12 g of the disazo compound of Exemplified Compound No. 29 (yield: 78.1%). The thus-obtained powder had a black color and did not melt up to 300° C. It was confirmed to be the intended product from its elemental analysis data and IR absorption spectrum (measured by the KBr method).

Elemental analysis:

|  | C | H | N | S |
|---|---|---|---|---|
| Found (%) | 74.21 | 4.16 | 8.33 | 3.42 |
| Calculated (%) | 74.55 | 4.21 | 8.42 | 3.21 |

IR absorption spectrum: Absorption based on $>C=O$: 1670 cm$^{-1}$.

Figure 3:
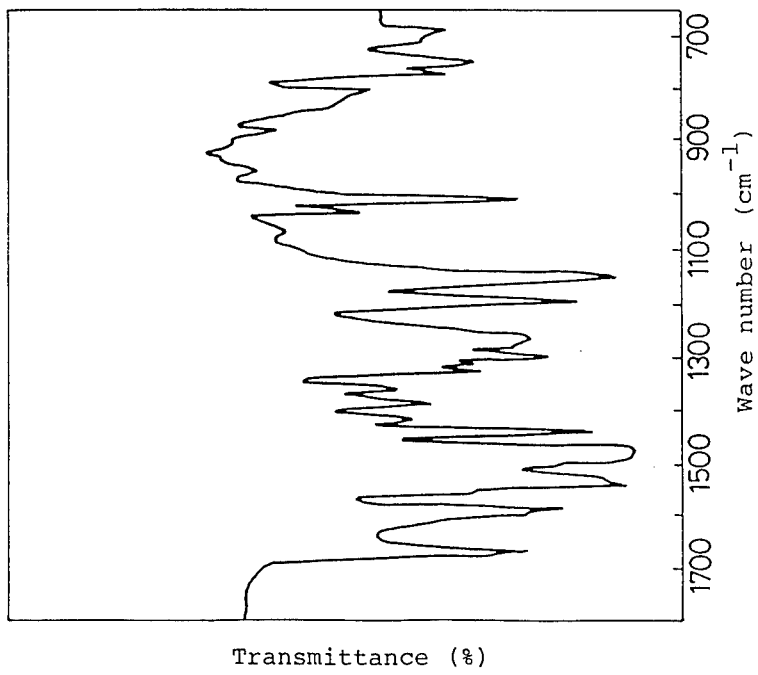

The IR absorption spectrum (measured by the KBr method) is shown in FIG. 3.

PREPARATION EXAMPLE 4

Dissolved in 1 l of N,N-dimethylformamide were 17.3 g of th benzocarbazole compound used as a coupler in Preparation Example 3 and 14 g of the tetrazonium salt synthesized in Preparation Example 2, followed by a dropwise addition of 140 ml of a 5% aqueous solution of sodium acetate at 0°–5° C. After stirring the reaction mixture for 1 hour at the same temperature, it was stirred at room temperature for further 5 hours. The resulting precipitate was collected by filtration. An operation consisting of dispersion into 1 l of N,N-dimethylformamide and subsequent collection by filtration was repeated 3 times. Thereafter, an operation consisting of dispersion into 1.5 l of water and subsequent collection by filtration was repeated 6 times. The precipitation was then dried to obtain 18.6 g of the disazo compound of Exemplified Compound No. 33 (yield: 69.6 g). The thus-obtained powder had a brownish black color and did not melt up to 300° C. It was confirmed to be the intended product from its elemental analysis data and IR absorption spectrum (measured by the KBr method).

Elemental analysis:

|  | C | H | N | S |
|---|---|---|---|---|
| Found (%) | 73.61 | 4.34 | 8.80 | 2.78 |
| Calculated (%) | 73.79 | 4.21 | 9.06 | 2.59 |

IR absorption spectrum: Absorption based on $>C=O$: 1660 cm$^{-1}$.

Figure 4:
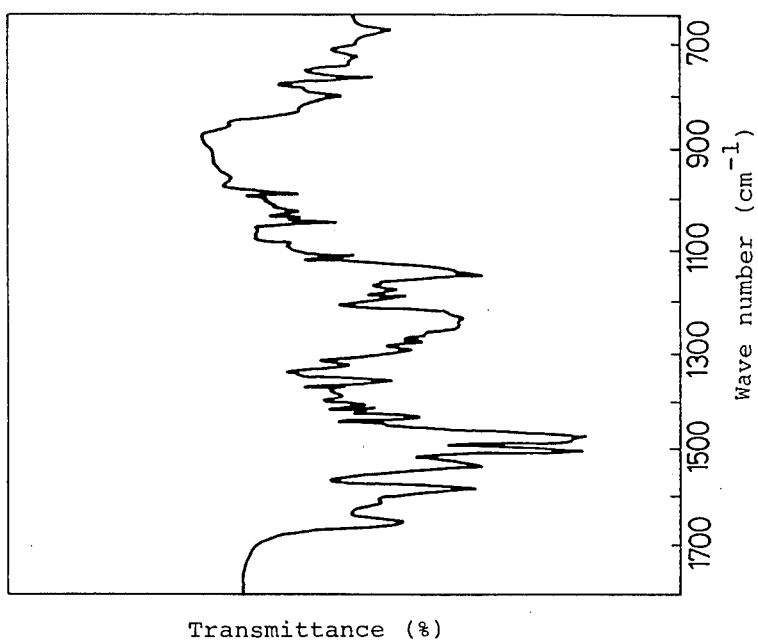

The IR absorption spectrum (measured by the KBr method) is shown in FIG. 4.

PREPARATION EXAMPLES 5–47

In the same manner as in the preceding Preparation Examples, amine compounds represented by the general formula (VIII) were separately diazotized and then reacted with their corresponding couplers. Elemental analysis data, characteristic peaks ($\nu_{C=O}$) of IR absorption spectra (KBr) and melting points of the thus-obtained compounds are summarized in Table 1.

TABLE 1

| Preparation Example | Exemplified Compound No. |  | Elemental analysis | | IR absorption spectram $\nu$ C = O cm$^{-1}$, KBr | Melting point (°C.) |
|---|---|---|---|---|---|---|
|  |  |  | Caluculated (%) | Found (%) |  |  |
| 5 | 3 | C | 77.50 | 77.24 | 1670 | >300 |
|  |  | H | 4.89 | 4.70 |  |  |
|  |  | N | 8.22 | 8.20 |  |  |
|  |  | S | 3.13 | 3.23 |  |  |
| 6 | 4 | C | 70.45 | 70.52 | 1680 | >300 |
|  |  | H | 3.79 | 3.82 |  |  |
|  |  | N | 10.61 | 10.50 |  |  |
|  |  | S | 3.03 | 3.09 |  |  |
| 7 | 5 | C | 71.88 | 71.84 | 1675 | >300 |
|  |  | H | 3.86 | 3.84 |  |  |
|  |  | N | 8.12 | 8.08 |  |  |
|  |  | S | 3.09 | 3.00 |  |  |
|  |  | Cl | 6.86 | 6.80 |  |  |
| 8 | 6 | C | 73.21 | 73.09 | 1680 | >300 |
|  |  | H | 3.79 | 3.68 |  |  |
|  |  | N | 9.23 | 9.21 |  |  |
|  |  | S | 2.64 | 2.62 |  |  |
|  |  | Cl | 5.85 | 5.78 |  |  |
| 9 | 7 | C | 74.05 | 74.14 | 1675 | >300 |
|  |  | H | 4.43 | 4.48 |  |  |
|  |  | N | 8.86 | 8.80 |  |  |
|  |  | S | 2.53 | 2.47 |  |  |
| 10 | 8 | C | 74.85 | 74.79 | 1670 | >300 |

TABLE 1-continued

| Preparation Example | Exemplified Compound No. | Elemental analysis | | | IR absorption spectrum $\nu$ C=O cm$^{-1}$, KBr | Melting point (°C.) |
|---|---|---|---|---|---|---|
| | | | Calculated (%) | Found (%) | | |
| | | H | 4.48 | 4.42 | | |
| | | N | 8.19 | 8.24 | | |
| | | S | 3.12 | 3.08 | | |
| 11 | 9 | C | 75.59 | 75.62 | 1680 | >300 |
| | | H | 3.94 | 3.91 | | |
| | | N | 11.02 | 11.10 | | |
| | | S | 3.15 | 3.13 | | |
| 12 | 10 | C | 71.96 | 71.91 | 1675 | >300 |
| | | H | 3.73 | 3.70 | | |
| | | N | 11.35 | 11.37 | | |
| | | S | 2.59 | 2.63 | | |
| 13 | 11 | C | 76.40 | 76.48 | 1675 | >300 |
| | | H | 4.97 | 5.01 | | |
| | | N | 8.70 | 8.64 | | |
| | | S | 2.48 | 2.45 | | |
| 14 | 12 | C | 75.57 | 75.52 | 1680 | >300 |
| | | H | 4.58 | 4.57 | | |
| | | N | 10.69 | 10.70 | | |
| | | S | 3.05 | 3.03 | | |
| 15 | 13 | C | 77.62 | 77.59 | 1675 | >300 |
| | | H | 4.20 | 4.20 | | |
| | | N | 9.79 | 9.80 | | |
| | | S | 2.80 | 2.83 | | |
| 16 | 14 | C | 72.48 | 72.45 | 1653 | >300 |
| | | H | 3.80 | 3.78 | 1692 | |
| | | N | 9.40 | 9.42 | | |
| | | S | 3.58 | 3.60 | | |
| 17 | 15 | C | 75.89 | 75.92 | 1700 | >300 |
| | | H | 3.56 | 3.58 | | |
| | | N | 11.07 | 11.05 | | |
| | | S | 3.16 | 3.13 | | |
| 18 | 16 | C | 76.15 | 76.10 | 1700 | >300 |
| | | H | 3.85 | 3.84 | | |
| | | N | 10.77 | 10.80 | | |
| | | S | 3.08 | 3.00 | | |
| 19 | 30 | C | 69.73 | 69.49 | 1675 | >300 |
| | | H | 3.75 | 3.74 | | |
| | | N | 7.87 | 7.82 | | |
| | | S | 3.00 | 3.14 | | |
| | | Cl | 6.65 | 6.54 | | |
| 20 | 31 | C | 68.38 | 68.64 | 1680 | >300 |
| | | H | 3.68 | 3.71 | | |
| | | N | 10.29 | 10.25 | | |
| | | S | 2.94 | 3.08 | | |
| 21 | 34 | C | 71.33 | 71.14 | 1680 | >300 |
| | | H | 3.69 | 3.57 | | |
| | | N | 9.00 | 8.83 | | |
| | | S | 2.57 | 2.64 | | |
| | | Cl | 5.70 | 5.59 | | |
| 22 | 37 | C | 71.29 | 71.34 | 1650 | >300 |
| | | H | 4.56 | 4.57 | 1690 | |
| | | N | 8.32 | 8.31 | | |
| | | S | 3.17 | 3.21 | | |
| 23 | 39 | C | 75.54 | 75.42 | 1675 | >300 |
| | | H | 4.22 | 4.18 | | |
| | | N | 10.04 | 10.08 | | |
| | | S | 2.55 | 2.47 | | |
| 24 | 40 | C | 75.50 | 75.42 | 1670 | >300 |
| | | H | 4.81 | 4.79 | | |
| | | N | 9.33 | 9.30 | | |
| | | S | 2.37 | 2.40 | | |
| 25 | 41 | C | 69.78 | 69.71 | 1675 | >300 |
| | | H | 3.68 | 3.54 | | |
| | | N | 9.27 | 9.17 | | |
| | | S | 2.36 | 2.42 | | |
| | | Cl | 7.84 | 7.75 | | |
| 26 | 42 | C | 68.20 | 68.42 | 1680 | >300 |
| | | H | 3.60 | 3.74 | | |
| | | N | 12.09 | 12.13 | | |
| | | S | 2.30 | 2.24 | | |
| 27 | 46 | C | 71.61 | 71.65 | 1680 | >300 |
| | | H | 3.63 | 3.58 | | |
| | | N | 10.34 | 10.21 | | |
| | | S | 1.97 | 2.03 | | |
| | | Cl | 6.55 | 6.50 | | |
| 28 | 51 | C | 73.66 | 73.34 | 1675 | >300 |
| | | H | 4.12 | 4.05 | | |
| | | N | 9.79 | 9.80 | | |
| | | S | 2.49 | 2.50 | | |
| 29 | 52 | C | 71.88 | 71.92 | 1670 | >300 |

TABLE 1-continued

| Preparation Example | Exemplified Compound No. | Elemental analysis | | | IR absorption spectrum $\nu$ C = O cm$^{-1}$, KBr | Melting point (°C.) |
|---|---|---|---|---|---|---|
| | | | Calculated (%) | Found (%) | | |
| | | H | 4.58 | 4.61 | | |
| | | N | 8.88 | 8.84 | | |
| | | S | 2.26 | 2.13 | | |
| 30 | 53 | C | 68.18 | 67.98 | 1675 | >300 |
| | | H | 3.60 | 3.54 | | |
| | | N | 9.06 | 9.02 | | |
| | | S | 2.30 | 2.34 | | |
| | | Cl | 7.66 | 7.51 | | |
| 31 | 54 | C | 66.67 | 66.74 | 1680 | >300 |
| | | H | 3.52 | 3.58 | | |
| | | N | 11.81 | 11.84 | | |
| | | S | 2.25 | 2.21 | | |
| 32 | 55 | C | 75.99 | 76.08 | 1670 | >300 |
| | | H | 4.11 | 4.10 | | |
| | | N | 8.77 | 8.80 | | |
| | | S | 2.23 | 2.18 | | |
| 33 | 56 | C | 72.99 | 72.62 | 1660 | >300 |
| | | H | 4.14 | 4.03 | | |
| | | N | 10.22 | 10.21 | | |
| | | S | 1.95 | 2.01 | | |
| 34 | 59 | C | 72.57 | 72.52 | 1700 | >300 |
| | | H | 3.24 | 3.21 | | |
| | | N | 12.39 | 12.30 | | |
| | | S | 2.36 | 2.34 | | |
| 35 | 60 | C | 72.57 | 72.70 | 1700 | >300 |
| | | H | 3.24 | 3.25 | | |
| | | N | 12.39 | 12.43 | | |
| | | S | 2.36 | 2.30 | | |
| 36 | 61 | C | 74.61 | 74.55 | 1675 | >300 |
| | | H | 4.15 | 4.23 | | |
| | | N | 10.88 | 10.74 | | |
| | | S | 2.07 | 1.98 | | |
| 37 | 62 | C | 72.12 | 72.28 | 1670 | >300 |
| | | H | 4.33 | 4.29 | | |
| | | N | 10.10 | 10.08 | | |
| | | S | 1.92 | 2.02 | | |
| 38 | 63 | C | 68.49 | 68.21 | 1675 | >300 |
| | | H | 3.57 | 3.60 | | |
| | | N | 9.99 | 10.04 | | |
| | | S | 1.90 | 1.83 | | |
| | | Cl | 8.44 | 8.39 | | |
| 39 | 67 | C | 77.06 | 76.92 | 1670 | >300 |
| | | H | 4.13 | 4.04 | | |
| | | N | 9.63 | 9.61 | | |
| | | S | 1.83 | 1.86 | | |
| 40 | 68 | C | 73.66 | 73.24 | 1660 | >300 |
| | | H | 4.16 | 4.03 | | |
| | | N | 11.09 | 10.87 | | |
| | | S | 1.58 | 1.74 | | |
| 41 | 69 | C | 70.66 | 70.49 | 1680 | >300 |
| | | H | 3.53 | 3.41 | | |
| | | N | 10.99 | 11.14 | | |
| | | S | 1.57 | 1.48 | | |
| | | Cl | 6.97 | 7.14 | | |
| 42 | 75 | C | 73.10 | 73.42 | 1675 | >300 |
| | | H | 4.06 | 4.03 | | |
| | | N | 10.66 | 10.71 | | |
| | | S | 2.03 | 1.94 | | |
| 43 | 76 | C | 73.53 | 73.59 | 1670 | >300 |
| | | H | 4.41 | 4.50 | | |
| | | N | 10.29 | 10.23 | | |
| | | S | 1.96 | 1.92 | | |
| 44 | 77 | C | 73.75 | 73.61 | 1675 | >300 |
| | | H | 3.84 | 3.78 | | |
| | | N | 1.02 | 0.98 | | |
| | | S | 2.05 | 2.12 | | |
| | | Cl | 9.09 | 9.13 | | |
| 45 | 82 | C | 72.51 | 72.78 | 1660 | >300 |
| | | H | 4.09 | 4.13 | | |
| | | N | 10.92 | 10.88 | | |
| | | S | 1.56 | 1.47 | | |
| 46 | 83 | C | 69.57 | 69.38 | 1680 | >300 |
| | | H | 3.48 | 3.24 | | |
| | | N | 10.82 | 10.80 | | |
| | | S | 1.55 | 1.47 | | |
| | | Cl | 6.86 | 6.93 | | |
| 47 | 87 | C | 65.67 | 65.74 | 1650 | >300 |
| | | H | 3.98 | 4.06 | 1690 | |
| | | N | 10.45 | 10.42 | | |

TABLE 1-continued

| Preparation Example | Exemplified Compound No. | Elemental analysis Caluculated (%) | Found (%) | IR absorption spectrum $\nu$ C = O cm$^{-1}$, KBr | Melting point (°C.) |
|---|---|---|---|---|---|
| | | S  1.99 | 1.84 | | |

EXAMPLE 1

In a ball mill, 0.5 part of a polyester resin (trade name: "Adhesive 49000", product of E. I. du Pont de Nemours & Co., Inc.), 0.5 part of Exemplified Compound No. 1 and 50 parts of tetrahydrofuran were ground and mixed. An aluminum plate was coated with the thus-obtained dispersion by a wire bar, followed by drying at 80° C. for 20 minutes to form a charge-generating layer of about 1 μm thick. Coated over the charge-generating layer by means of a wire bar was a solution of 1 part of 9-ethylcarbazole-3-aldehyde-1-methyl-1-phenylhydrozone and 1 part of a polyester resin (trade name: "Vyron 200", product of Toyobo Co., Ltd.) in 10 parts of chloroform. The thus-coated solution was dried at 80° C. for 30 minutes to form a charge-transporting layer of about 18 μm thick, thereby fabricating the laminated photoreceptor shown in FIG. 6.

Using a testing apparatus for electrostatic copying paper ("Model EPA-8100", trade name; manufactured by Kabushiki Kaisha Kawaguchi Denki Seisakusho), the photoreceptor was charged by a corona discharge at an impression voltage of −6 KV. The surface potential $V_0$ at that time was measured. The receptor was left over for 2 seconds in a dark place and the surface potential $V_2$ at that time was also measured. Under conditions such that the surface illuminance of the photoreceptor reached 5 lux, the photoreceptor was exposed to light from a halogen lamp (color temperature: 2856° K.) and the exposure time $E_{\frac{1}{2}}$ (lux·sec) required to reduce the initial surface potential $V_2$ to $\frac{1}{2} \cdot V_2$ was measured. Further, the surface potential in 10 seconds after the exposure, i.e., the residual potential was measured. Results are shown in Table 2.

EXAMPLES 2–50

Photoreceptors were separately fabricated in the same manner as in Example 1 except that compounds shown in Table 2 were used respectively in lieu of Exemplified Compound No. 1, followed by measurement of their $E_{\frac{1}{2}}$ values. Results are shown in Table 2 together with other results.

TABLE 2

| EX. | Exemplified Compound No. | $V_0$(V) | $V_2$(V) | $V_R$(V) | $E_{\frac{1}{2}}$ (lux · sec) |
|---|---|---|---|---|---|
| 1 | 1 | −937 | −908 | −5 | 4.3 |
| 2 | 3 | −894 | −880 | −3 | 1.8 |
| 3 | 5 | −984 | −935 | −4 | 3.0 |
| 4 | 4 | −1012 | −980 | −2 | 2.0 |
| 5 | 17 | −990 | −978 | −1 | 1.9 |
| 6 | 2 | −880 | −875 | −1 | 1.5 |
| 7 | 6 | −930 | −900 | −4 | 2.0 |
| 8 | 7 | −1006 | −970 | −1 | 1.8 |
| 9 | 11 | −790 | −770 | −2 | 2.1 |
| 10 | 12 | −896 | −872 | −1 | 2.2 |
| 11 | 13 | −654 | −630 | −3 | 3.1 |
| 12 | 14 | −923 | −902 | −2 | 2.0 |
| 13 | 15 | −812 | −783 | −4 | 2.9 |
| 14 | 16 | −1106 | −992 | −3 | 2.5 |
| 15 | 29 | −954 | −931 | −2 | 2.1 |
| 16 | 30 | −1016 | −994 | −3 | 2.0 |
| 17 | 31 | −845 | −824 | −2 | 2.4 |
| 18 | 34 | −714 | −697 | −4 | 3.2 |
| 19 | 38 | −857 | −841 | −5 | 3.1 |
| 20 | 39 | −923 | −910 | −1 | 2.6 |
| 21 | 41 | −971 | −962 | −2 | 4.0 |
| 22 | 42 | −840 | −821 | −4 | 3.8 |
| 23 | 45 | −1103 | −1084 | −3 | 2.0 |
| 24 | 46 | −948 | −927 | −1 | 3.6 |
| 25 | 49 | −624 | −618 | −3 | 4.9 |
| 26 | 50 | −874 | −865 | −2 | 4.1 |
| 27 | 51 | −924 | −915 | −1 | 2.4 |
| 28 | 52 | −863 | −840 | −4 | 5.0 |
| 29 | 53 | −901 | −884 | −2 | 2.3 |
| 30 | 55 | −913 | −905 | −1 | 3.8 |
| 31 | 56 | −972 | −958 | −1 | 2.0 |
| 32 | 58 | −927 | −916 | −2 | 2.5 |
| 33 | 60 | −992 | −977 | −2 | 3.6 |
| 34 | 61 | −843 | −838 | −1 | 2.5 |
| 35 | 63 | −802 | −784 | −2 | 2.2 |
| 36 | 64 | −791 | −784 | −1 | 2.4 |
| 37 | 66 | −611 | −603 | −3 | 4.7 |
| 38 | 68 | −947 | −940 | −1 | 2.0 |
| 39 | 69 | −876 | −869 | −1 | 3.1 |
| 40 | 71 | −964 | −953 | −4 | 2.9 |
| 41 | 73 | −832 | −824 | −2 | 3.6 |
| 42 | 74 | −851 | −840 | −3 | 2.8 |
| 43 | 75 | −1014 | −1002 | −2 | 2.3 |
| 44 | 76 | −667 | −650 | −4 | 3.6 |
| 45 | 77 | −848 | −840 | −1 | 2.3 |
| 46 | 79 | −722 | −717 | −3 | 3.2 |
| 47 | 82 | −911 | −894 | −2 | 2.1 |
| 48 | 83 | −882 | −877 | −4 | 3.5 |
| 49 | 89 | −826 | −811 | −3 | 3.0 |
| 50 | 90 | −939 | −928 | −2 | 2.8 |

EXAMPLES 51–85

Photoreceptors were separately fabricated in the same manner as in Example 1 except that 1-phenyl-3-(4-diethylaminostyryl)-5-(4-diethylaminophenyl)pyrazoline was used as a charge-transporting material in place of 9-ethylcarbozole-3-aldehyde-1-methyl-1-phenylhydrazone and azo compounds shown in Table 3 were respectively employed as charge-generating materials, followed by measurement of their $E_{\frac{1}{2}}$ values. Results are shown in Table 3 together with other results.

TABLE 3

| EX. | Exemplified Compound No. | $V_0$(V) | $V_2$(V) | $V_R$(V) | $E_{\frac{1}{2}}$ (lux · sec) |
|---|---|---|---|---|---|
| 51 | 8 | −854 | −830 | −1 | 2.2 |
| 52 | 9 | −892 | −882 | −2 | 2.9 |
| 53 | 2 | −987 | −980 | 0 | 1.2 |
| 54 | 10 | −764 | −750 | −2 | 2.4 |
| 55 | 18 | −1025 | −996 | −3 | 2.0 |
| 56 | 19 | −838 | −810 | −5 | 4.5 |
| 57 | 20 | −792 | −771 | −2 | 2.3 |
| 58 | 21 | −941 | −930 | −1 | 1.7 |
| 59 | 22 | −882 | −869 | −3 | 2.1 |
| 60 | 23 | −919 | −893 | −4 | 1.9 |
| 61 | 32 | −810 | −800 | −2 | 2.9 |
| 62 | 34 | −907 | −894 | −1 | 2.1 |
| 63 | 37 | −781 | −769 | −3 | 2.4 |
| 64 | 38 | −862 | −849 | −3 | 3.1 |
| 65 | 39 | −915 | −907 | −1 | 2.7 |
| 66 | 40 | −934 | −930 | −2 | 4.0 |
| 67 | 43 | −892 | −881 | −3 | 4.1 |
| 68 | 46 | −1093 | −1075 | −1 | 2.4 |
| 69 | 47 | −749 | −722 | −2 | 3.3 |
| 70 | 48 | −808 | −789 | −4 | 3.5 |
| 71 | 53 | −944 | −936 | −1 | 2.2 |

TABLE 3-continued

| EX. | Exemplified Compound No. | $V_0(V)$ | $V_2(V)$ | $V_R(V)$ | $E_{\frac{1}{2}}$ (lux·sec) |
|---|---|---|---|---|---|
| 72 | 54 | −880 | −865 | −1 | 2.3 |
| 73 | 57 | −1152 | −1126 | −3 | 2.0 |
| 74 | 60 | −984 | −965 | −2 | 2.8 |
| 75 | 61 | −956 | −940 | −1 | 2.1 |
| 76 | 62 | −844 | −821 | −4 | 3.7 |
| 77 | 68 | −778 | −760 | −2 | 2.0 |
| 78 | 69 | −814 | −801 | −1 | 2.2 |
| 79 | 70 | −991 | −979 | −2 | 2.9 |
| 80 | 72 | −940 | −927 | −1 | 3.0 |
| 81 | 75 | −996 | −980 | −1 | 2.6 |
| 82 | 76 | −827 | −803 | −3 | 3.8 |
| 83 | 77 | −1046 | −1018 | −2 | 2.4 |
| 84 | 80 | −793 | −760 | −1 | 2.9 |
| 85 | 81 | −629 | −604 | −3 | 4.2 |

EXAMPLES 86–115

Photoreceptors were separately fabricated in the same manner as in Example 1 except that 2,5-bis(4-diethylaminophenyl)-1,3,4-oxadiazole was used as a charge-transporting material in place of 9-ethyl-carbozole-3-aldehyde-1-methyl-1-phenylhydrazone and azo compounds shown in Table 3 were respectively employed as charge-generating materials, followed by measurement of their $E_{\frac{1}{2}}$ values. Results are shown in Table 4 together with other results.

TABLE 4

| EX. | Exemplified Compound No. | $V_0(V)$ | $V_2(V)$ | $V_R(V)$ | $E_{\frac{1}{2}}$ (lux·sec) |
|---|---|---|---|---|---|
| 86 | 1 | −1056 | −998 | −5 | 4.7 |
| 87 | 24 | −926 | −910 | −2 | 2.2 |
| 88 | 2 | −923 | −909 | −1 | 2.0 |
| 89 | 25 | −864 | −831 | −2 | 3.1 |
| 90 | 26 | −824 | −804 | −4 | 4.1 |
| 91 | 27 | −961 | −950 | −2 | 3.8 |
| 92 | 28 | −977 | −958 | −4 | 3.9 |
| 93 | 16 | −994 | −978 | −2 | 3.3 |
| 94 | 29 | −892 | −881 | −1 | 2.3 |
| 95 | 30 | −920 | −903 | −1 | 2.1 |
| 96 | 33 | −918 | −884 | −2 | 3.0 |
| 97 | 35 | −794 | −772 | −4 | 3.9 |
| 98 | 36 | −905 | −874 | −3 | 4.1 |
| 99 | 39 | −928 | −904 | −1 | 2.2 |
| 100 | 41 | −1022 | −996 | −1 | 2.3 |
| 101 | 42 | −973 | −955 | −2 | 2.6 |
| 102 | 46 | −872 | −849 | −3 | 2.5 |
| 103 | 49 | −781 | −739 | −4 | 3.3 |
| 104 | 50 | −864 | −840 | −1 | 3.0 |
| 105 | 51 | −969 | −938 | −2 | 2.2 |
| 106 | 56 | −669 | −647 | −1 | 2.1 |
| 107 | 57 | −940 | −931 | −1 | 2.4 |
| 108 | 61 | −975 | −960 | −2 | 2.0 |
| 109 | 65 | −922 | −889 | −2 | 3.1 |
| 110 | 67 | −1047 | −1014 | −3 | 3.7 |
| 111 | 75 | −1052 | −1019 | −1 | 2.0 |
| 112 | 79 | −717 | −684 | −4 | 4.0 |
| 113 | 84 | −844 | −818 | −2 | 3.2 |
| 114 | 86 | −972 | −960 | −3 | 2.9 |
| 115 | 88 | −859 | −841 | −2 | 3.0 |

COMPARATIVE EXAMPLE 1

A photoreceptor was fabricated in the same manner as in Example 1 except that a disazo compound of the following structural formula:

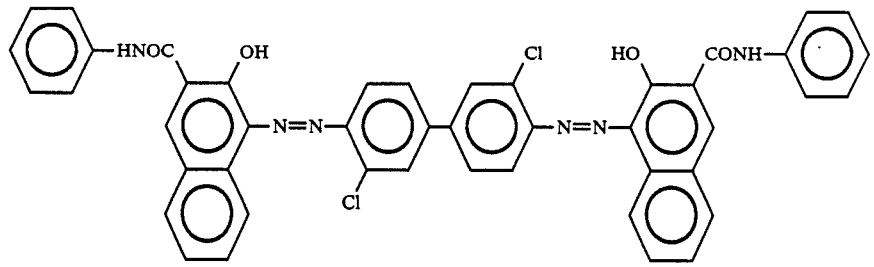

which is disclosed in Japanese Patent Publication No. 42380/1980, was used as a charge-generating material. $E_{\frac{1}{2}}$ was 12.0 (lux·sec).

COMPARATIVE EXAMPLE 2

A photoreceptor was fabricated in the same manner as in Example 1 except that a disazo compound of the following structural formula:

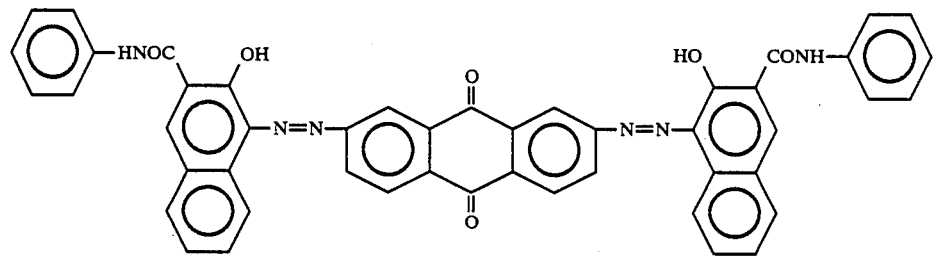

which is disclosed in Japanese Patent Laid-Open No. 202451/1983, was used as a charge-generating material. $E_{\frac{1}{2}}$ was 11.4 (lux·sec).

EXAMPLE 116

Separately using the photoreceptors fabricated in Examples 1, 6 and 58 respectively, an electrification-exposure operation was repeated 1,000 times to obtain values shown in Table 5.

TABLE 5

| Photosensitive material | Repetition number of charging exposure operation | $V_0(V)$ | $V_2(V)$ | $V_R(V)$ | $E_{\frac{1}{2}}$ (lux·sec) |
|---|---|---|---|---|---|
| EX. 1 | 1 | −937 | −908 | −5 | 4.3 |
|  | 1000 | −935 | −901 | −6 | 4.3 |
| EX. 6 | 1 | −880 | −875 | −1 | 1.5 |
|  | 1000 | −885 | −873 | −1 | 1.6 |
| EX. 58 | 1 | −941 | −930 | −1 | 1.7 |
|  | 1000 | −930 | −925 | −1 | 1.8 |

As has been described above, the electrophotographic photoreceptor making use of the azo compound of this invention has high sensitivity and shows stable performance even when used repeatedly. Accordingly, the electrophotographic photoreceptor of this invention is also considered to be excellent in durability.

The electrophotographic photoreceptor of this invention can therefore be used widely not only in electrophotographic copying machines but also in various printers and electrophotographic plate-making systems both of which make use of the principle of electrophotographic copying.

We claim:

1. An electrophotographic photoreceptor wherein at least one azo compound represented by the following general formula (I):

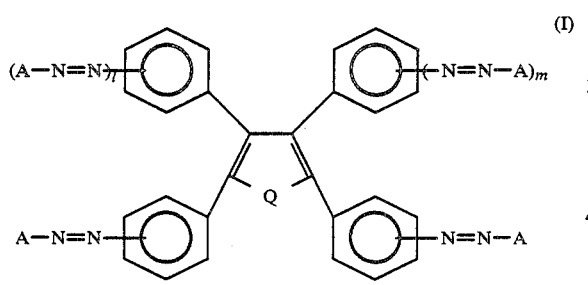

wherein A means a coupler residuum, Q denotes a sulfur atom or >SO$_2$, and l and m stand independently for 1 or 0, is contained in a photosensitive layer provided on an electrically-conductive base.

2. The electrophotographic photoreceptor as claimed in claim 1, wherein the azo compound is represented by the following general formula:

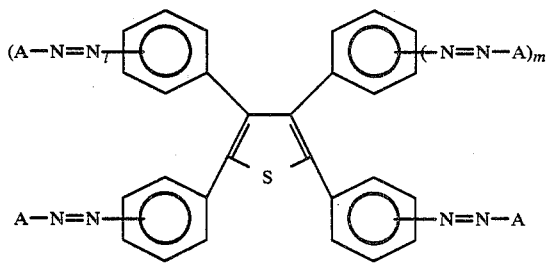

wherein A means a coupler residuum, and l and m stand independently for 1 or 0.

3. The electrophotographic photoreceptor as claimed in claim 2, wherein the azo compound is represented by the following general formula:

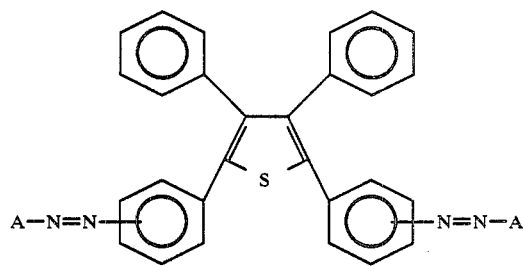

wherein A means a coupler residuum.

4. The electrophotographic photoreceptor as claimed in claim 1, wherein the azo compound is represented by the following general formula:

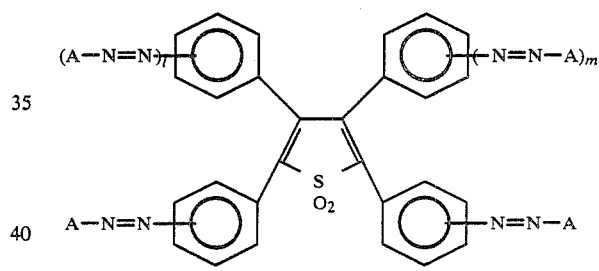

wherein A means a coupler residuum, and l and m stand independently for 1 or 0.

5. The electrophotographic photoreceptor as claimed in claim 1, wherein the photosensitive layer contains at least a charge-transporting material and a binder in addition to the azo compound.

6. The electrophotographic photoreceptor as claimed in claim 1, wherein the content of the azo compound in the photosensitive layer is 50 wt.% or less.

7. The electrophotographic photoreceptor as claimed in claim 6, wherein the content of the charge-transporting material in the photosensitive layer is 10–95 wt.%.

8. The electrophotographic photoreceptor as claimed in claim 1, wherein the photosensitive layer is a laminate of a charge producing layer, which contains the azo compound, and a charge transfer layer which contains a charge-transporting material.

9. The electrophotographic photoreceptor as claimed in claim 8, wherein the content of the azo compound is at least 30 wt.%.

10. The electrophotographic photoreceptor as claimed in claim 9, wherein the content of the charge-transporting material is 10–95 wt.%.

11. The electrophotographic photoreceptor as claimed in claim 1, wherein each A—N=N group is at the 4-position of the phenyl group.

12. The electrophotographic photoreceptor as claimed in claim 2, wherein each A—N=N group is at the 4-position of the phenyl group.

13. The electrophotographic photoreceptor as claimed in claim 3, wherein each A—N=N group is at the 4-position of the phenyl group.

14. The electrophotographic photoreceptor as claimed in claim 4, wherein each A—N=N group is at the 4-position of the phenyl group.

15. The electrophotographic photoreceptor as claimed in claim 1, wherein the photosensitive layer contains at least a charge-transporting material and a binder in addition to the azo compound; wherein the content of the azo compound in the photosensitive layer is 50 wt.% or less; and wherein the content of the charge-transporting material in the photosensitive layer is 10–95 wt.%.

16. The electrophotographic photoreceptor as claimed in claim 1, wherein the photosensitive layer is a laminate of a charge producing layer, which contains the azo compound, and a charge transfer layer which contains a charge-transporting material; wherein the content of the azo compound is at least 30 wt.%; and wherein the content of the charge-transporting material is 10–95 wt.%.

* * * * *